(12) United States Patent
Takai

(10) Patent No.: US 6,269,185 B1
(45) Date of Patent: *Jul. 31, 2001

(54) IMAGE PROCESSING APPARATUS AND IMAGE FORMING APPARATUS

(75) Inventor: Tsutomu Takai, Kawasaki (JP)

(73) Assignee: Kabushiki Kaisha Toshiba, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/071,542

(22) Filed: May 4, 1998

(30) Foreign Application Priority Data

May 9, 1997 (JP) .................................................. 9-119695

(51) Int. Cl.[7] ..................................................... G06K 9/00
(52) U.S. Cl. ........................................... 382/167; 358/518
(58) Field of Search ..................................... 358/518, 523, 358/525, 1.9; 395/118; 382/167

(56) References Cited

U.S. PATENT DOCUMENTS

| 4,275,413 | 6/1981 | Sakamoto et al. | 358/525 |
|---|---|---|---|
| 5,241,373 | 8/1993 | Kanamori et al. | 348/645 |
| 5,390,035 | * 2/1995 | Kasson et al. | 358/518 |
| 5,428,465 | 6/1995 | Kanamori et al. | 358/518 |
| 5,581,376 | 12/1996 | Harrington | 358/518 |
| 5,721,572 | * 2/1998 | Wan et al. | 345/431 |
| 5,870,077 | * 2/1999 | Dillinger et al. | 345/153 |

FOREIGN PATENT DOCUMENTS 8-14843   2/1996  (JP) .

OTHER PUBLICATIONS

Kanamori et al.; "Color Correction Technique for Hard Copies by 4–Neighbors Interpolation Method"; Journal of Imaging Science and Technology; vol. 36, No. 1; Jan./Feb. 1992; pp. 73–80.

* cited by examiner

Primary Examiner—Cheukfan Lee
(74) Attorney, Agent, or Firm—Foley & Lardner

(57) ABSTRACT

Eight lattice-point data items of a unit cube are output from LUT memories according to upper 3-bit signal of 3-dimensional color space signals input to an input system. The magnitudes of the input 3-dimensional color space signals are compared in a comparison operating section. The spatial coordinate position of an output value is determined based on the result of comparison by a spatial position determining section and one of the divided polyhedrons is selected by a divided polyhedron selecting section. Further, whether or not a to-be-derived output value is present near the boundary surface of the divided polyhedron is determined based on the result of comparison of the comparison operating section by a boundary surface neighborhood determining section. When it is determined that the to-be-output value lies near the boundary surface, lattice-point data items are selectively corrected by data correction processing section. Lattice-point data for the polyhedron selected by the divided polyhedron selecting section is selected from lattice-point data containing the corrected lattice-point data items by use of interpolation operation data selected sections and is subjected to the interpolation process by interpolation operation processing sections to derive an output value.

17 Claims, 18 Drawing Sheets

FIG. 7A  HDEN

FIG. 7B  CLK

FIG. 7C  R,G,B

FIG. 7D  ADDRESS SIGNAL

FIG. 7E  MEMORY OUTPUT SIGNAL P0–P7

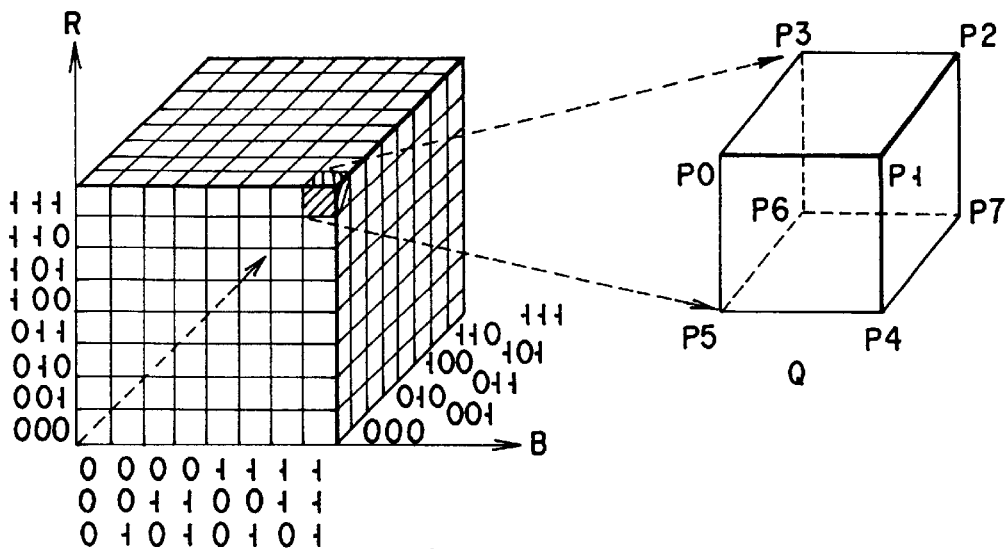
FIG. 20
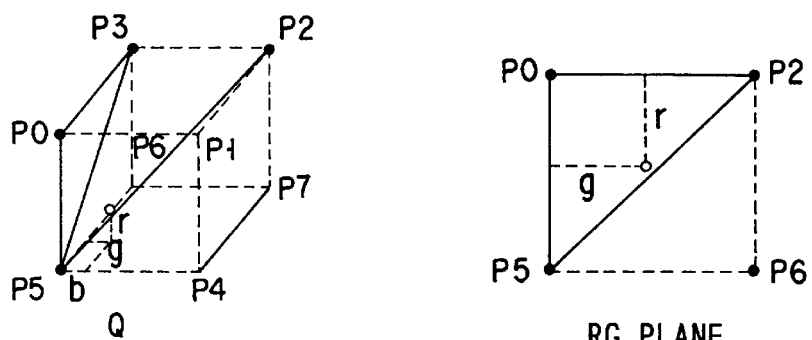
FIG. 21A
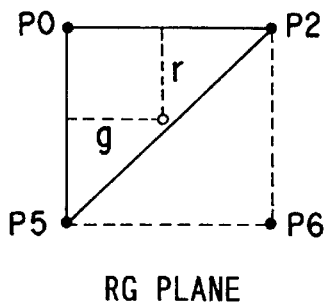
FIG. 22
| S81 | r≧b | b>g | g>r | DIVIDED TETRAHEDRON |
|---|---|---|---|---|
| 1 | TRUE | TRUE | FALSE | P5-P0-P1-P2 |
| 2 | TRUE | FALSE | FALSE | P5-P0-P3-P2 |
| 3 | TRUE | FALSE | TRUE | P5-P6-P3-P2 |
| 4 | FALSE | TRUE | TRUE | P5-P4-P7-P2 |
| 5 | FALSE | TRUE | FALSE | P5-P6-P7-P2 |
| 6 | FALSE | FALSE | TRUE | P5-P4-P1-P2 |
FIG. 21B

IMAGE PROCESSING APPARATUS AND IMAGE FORMING APPARATUS

BACKGROUND OF THE INVENTION

This invention relates to an image processing apparatus using an interpolation method of 3-dimensional color space and an image forming apparatus for forming a color image by forming images of respective color components on a plurality of photosensitive drums by use of the above image processing apparatus and superposing the color images on recording paper.

Various media for dealing with color images, for example, a color facsimile and an image forming apparatus such as a color copying machine, color printer, optical disk, video recorder/player and television receiver are now developed. In the medium dealing with the color image, ideal color reproduction may be achieved by transmitting original image colors as they are as a final output. However, in a device dealing with color images, color signal spaces used for reproducing the original image colors are different in the input and output sections in many cases and it is absolutely necessary to convert the color signal space.

Conversion of the color signal space is represented as a general form by use of relational expressions indicating the relations between three color outputs and three color inputs. The color signal space converting process becomes extremely complicated because each color of the three outputs is based on the functional operation of the three input variables. Therefore, a look-up table (which is hereinafter referred to as LUT) method is used as a means for flexibly converting the color signal space for any type of function.

In the LUT method, all of the input-output relations are stored in a memory in the form of dictionary and a desired converted output can be immediately obtained by referring to the memory by use of a 3-color input signal. However, in the LUT method, a memory of a capacity as large as approx. 50 Mbytes in the case of normal full-color input of 8 bits×3 colors is required. If the memory of such a large capacity is used, a problem of high cost occurs, it takes a long time to form the table and it becomes impossible to quickly convert the color signal space for various purposes. Therefore, the recent color signal space conversion process utilizes an LUT interpolation method using an LUT memory of small capacity and a 3-dimensional interpolation operation unit.

Conversion output values on rough lattice points of the input color signal space are stored in the small-capacity LUT memory and precise output values for the rough conversion output values are derived by the interpolation operation by use of the 3-dimensional interpolation operation unit. By the above processes, the color signal space converting function which is approximately equivalent to that obtained when a large-capacity LUT memory is used can be attained.

As the 3-dimensional color space interpolation method, (a) a cube interpolation method, (b) hexahedron interpolation method, (c) pentahedron interpolation method, and (d) tetrahedron interpolation method are proposed. The cube interpolation method (a) is the simplest interpolation method and is attained by simply diving an input color space into unit cubes each including eight lattice points along the 3-color axes and effecting the interpolation process by using color conversion values on the lattice points to derive output values. On the other hand, the hexahedron interpolation method (b), pentahedron interpolation method (c), and tetrahedron interpolation method (d) are methods for further dividing the unit cube used in the cube interpolation method into hexahedrons, pentahedrons and tetrahedrons, respectively, and then effecting the interpolation process.

However, in the conventional 3-dimensional color space interpolation method, since the cube interpolation method uses the largest number (eight points) of lattice-point data items for the interpolation operation, the number of 3-dimensinal multiplication operations is large and the circuit scale will become large. Further, in the hexahedron interpolation method, pentahedron interpolation method and tetrahedron interpolation method, since the unit cube is divided into hexahedrons, pentahedrons and tetrahedrons, respectively, the number of lattice-point data items used for the interpolation operation is small and the precision of interpolation will become low. Further, since data items to be referred to on both sides of the boundary surface becomes different from each other as the result of division, the continuity of the interpolation data near or on both sides of the boundary surface will be lost.

As described above, in the image processing apparatus using the conventional 3-dimensional color space interpolation method, since the cube interpolation method uses the largest number (eight points) of lattice-point data items for the interpolation operation, the number of 3-dimensinal multiplication operations is large and the circuit scale will become large. Further, in the hexahedron interpolation method, pentahedron interpolation method and tetrahedron interpolation method, since the unit cube is divided into polyhedrons such as hexahedrons, pentahedrons and tetrahedrons, respectively, the number of lattice-point data items used for the interpolation operation is small and the precision of interpolation is low. Further, since data items to be referred to on both sides of the boundary surface of the polyhedron becomes different from each other as the result of division (because different polyhedrons are referred to), the continuity of the output result near the boundary surface is lost.

BRIEF SUMMARY OF THE INVENTION

Accordingly, an object of this invention is to provide an image processing apparatus using a 3-dimensinal color space interpolation method and capable of reducing the circuit scale, enhancing the precision of interpolation and maintaining the continuity of the output results and an image forming apparatus having the above image processing apparatus.

In order to achieve the above object, according to one aspect of the present invention, there is provided an image processing apparatus comprising means for storing a color space conversion data table and supplying color space conversion data corresponding to input image signals by referring to the table; means for selecting a divided polyhedron in which an output value to be derived is present based on the input image signals; means for determining whether or not the to-be-derived output value lies on or near the boundary surface of the divided polyhedron based on the input image signals; means for correcting the color space conversion data when the determining means determines that the to-be-derived output value lies on or near the boundary surface of the divided polyhedron; and interpolation operating means for effecting the interpolation operation for a divided polyhedron selected by the selecting means by use of the color space conversion data corrected by the correction means.

The apparatus of this invention further includes operation data selecting means for selecting interpolation operation data for the divided polyhedrons selected by the divided polyhedron selecting means from the color space conversion data supplied from the correcting means and in which the interpolation operation means includes means for effecting the interpolation operation by use of the interpolation operation data selected by the operation data selecting means.

The LUT memory used as the storage means outputs eight lattice-point data items of the unit cube based on upper 3-bit signals of 3-dimensional color space signals input to an input system. Further, the lower five bits of the input 3-dimensional color space signals are subjected to a comparison process by comparing means. The spatial position of a to-be-derived output value is determined by determining means based on the result of comparison by the comparing means, and one of the divided polyhedrons is selected by the divided polyhedron selecting means. Further, whether or not the to-be-derived output value lies near the boundary surface of the divided polyhedron is determined by the boundary surface neighborhood determining means based on the result of comparison by the comparing means. When it is determined that the output value lies near the boundary surface, the correcting means corrects the eight lattice-point data items. The operation data selecting means selects lattice-point data of the divided polyhedron selected by the divided polyhedron selecting means from the lattice-point data output by the correcting means and outputs the selected data. The interpolation operation processing means effects the interpolation operation by use of the lattice-point data of the selected divided polyhedron and supplies the to-be-derived output value.

The input image signal includes 3-dimensional color space RGB signals and the boundary surface neighborhood determining means determines whether or not the to-be-derived output value lies on or near the boundary surface of the divided polyhedron according to differences between the respective signal components of the 3-dimensional color space RGB signals.

Further, the boundary surface neighborhood determining means supplies weighting factors according to differences between the respective signal components of the 3-dimensional color space RGB signals. The correcting means corrects the color space conversion data by use of the weighting factors.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIGS. 7A to 7E are timing charts showing examples of the timings of the respective sections;

FIG. 20 is a diagram for illustrating a unit cube for color conversion;

FIGS. 21A and 21B are diagrams for illustrating a divided tetrahedron and a dividing method; and FIG. 22 is a view showing a divided tetrahedron projected on an RG plane.

DETAILED DESCRIPTION OF THE INVENTION

There will now be described an embodiment of this invention with reference to the accompanying drawings.

Figure 1:
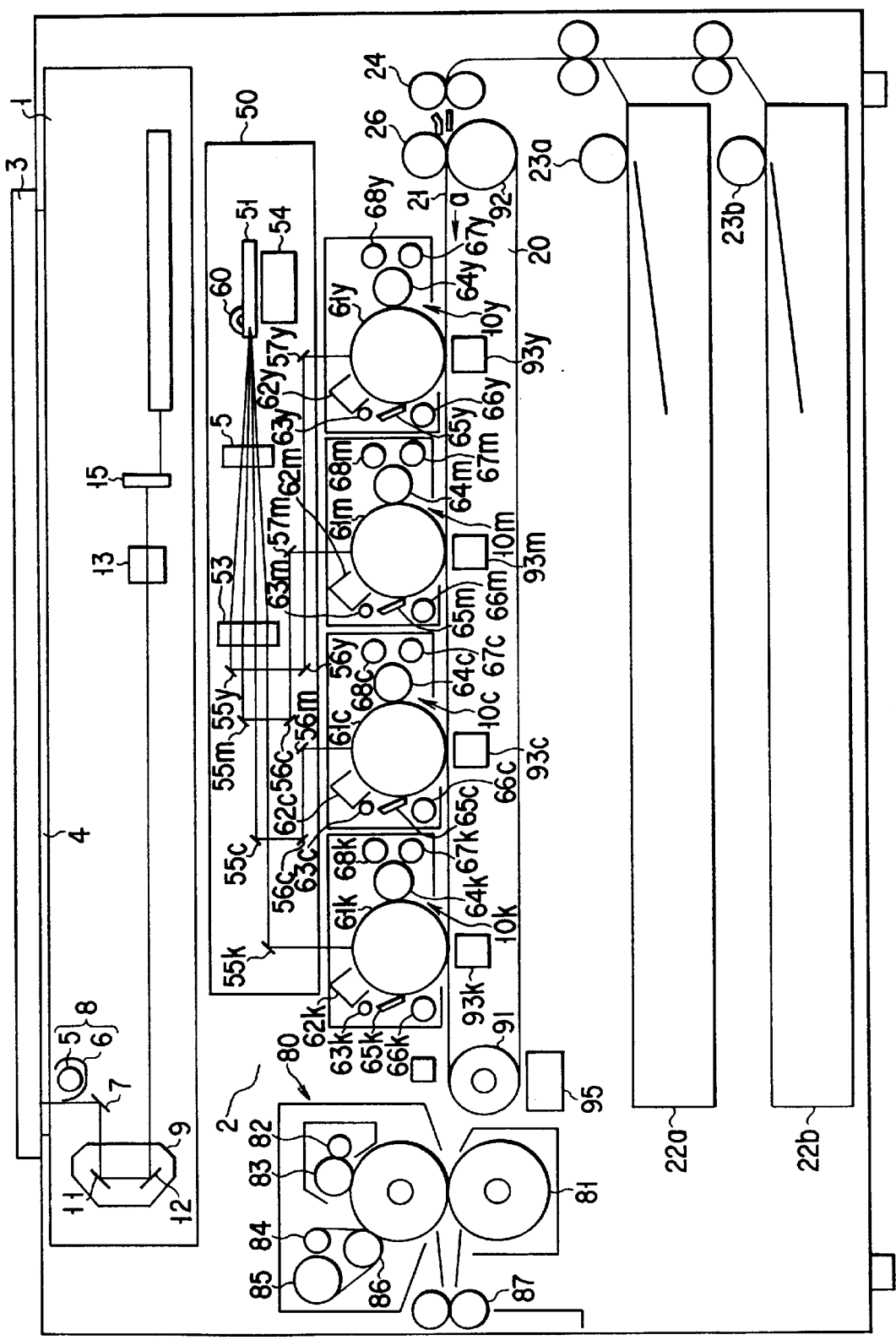
FIG. 1 is a cross sectional view showing the structure of a digital color copying machine related to an image forming apparatus of this invention.

FIG. 1 shows the construction of an image processing apparatus of this invention and the construction of a digital color copying machine related to an image forming apparatus having the image processing apparatus. The digital color copying machine includes a scanner section 1 used as reading means and a printer section 2 used as image forming means.

The scanner section 1 for reading the image of a document has a document table cover 3 disposed on the upper portion thereof and a document table 4 formed of transparent glass on which a document D is to be set and disposed to face the document table cover 3 set in the closed state. Below the document table 4, there are disposed an exposure lamp 5 for illuminating the document D placed on the document table 4, a reflector 6 for converging light from the exposure lamp 5 on the document D, and a first mirror 7 for reflecting the reflected light from the document D in the left direction in the drawing. The exposure lamp 5, reflector 6 and first mirror 7 are fixed on a first carriage 8. The first carriage 8 is coupled to a pulse motor (not shown) via a toothed belt (not shown) or the like and is moved in parallel to the document table 4 by the driving force transmitted from the pulse motor.

On the left side with respect to the first carriage 8 in the drawing, that is, in a position to which the reflected light from the first mirror 7 is guided, a second carriage 9 which can be moved in parallel to the document table 4 by means of a driving mechanism (not shown) such as a toothed belt and a DC motor is disposed. A second mirror 11 for guiding the reflected light reflected from the document D via the first mirror 7 in the downward direction and a third mirror 12 for guiding the reflected light from the second mirror 11 in the right direction in the drawing are disposed at right angles with each other on the second carriage 9. The second carriage 9 is moved to follow the first carriage 8 and moved in parallel to the document table 4 at a speed half that of the first carriage 8.

In a plane containing the optical axis of light guided in a reverse direction via the second carriage 9, an image forming lens 13 for forming an image with a preset magnification by use of the reflected light from the second carriage 9 is disposed, and a CCD image sensor (photoelectric converting element) 15 for converting the reflected light converged by the image forming lens 14 into an electrical signal, that is, image data is disposed in a plane which is substantially perpendicular to the optical axis of light passing through the image forming lens 13.

When light from the exposure lamp 5 is converged on the document D on the document table 4 by means of the reflector 6, reflected light from the document D is supplied to the CCD image sensor 15 via the first mirror 7, second mirror 11, third mirror 12 and image forming lens 13 and converted into image data.

The printer section 2 includes first to fourth image forming sections lay, 10y, 10m, 10c, 10k for respectively forming images of colors separated into respective color components based on a known subtractive color process, that is, images of four colors including yellow (which is hereinafter indicated by y), magenta (which is a sort of red and is hereinafter indicated by m), cyan (which is bluish purple and is hereinafter indicated by c), and black (which is hereinafter indicated by k).

Below the image forming sections 10y, 10m, 10c, 10k, a feeding mechanism 20 used as feeding means having a conveyor belt 21 for carrying images of respective colors formed by the respective image forming sections in a direction indicated by an arrow a in the drawing is disposed. The conveyor belt 21 is stretched between a driving roller 91 rotated in the arrow a direction by a belt motor (not shown) and a driven roller 92 disposed at a preset distance from the driving roller 91 and is driven in the arrow a direction at a constant speed in an endless manner. The image forming sections 10y, 10m, 10c, 10k are arranged in a linear form in the feeding direction of the conveyor belt 21.

The image forming sections 10y, 10m, 10c, 10k respectively include photosensitive drums 61y, 61m, 61c, 61k used as image carriers each of which is formed to rotate in the same direction with its outer surface set in contact with the conveyor belt 21. The photosensitive drums are respectively connected to drum motors (not shown) for rotating the photosensitive drums at a preset peripheral speed.

The axes of the photosensitive drums 61y, 61m, 61c, 61k are set perpendicular to the direction in which the image is fed by the conveyor belt 21 and are set at an equal interval. In the following description, the axial direction of the photosensitive drum is set as a main scanning direction (second direction) and the direction in which the photosensitive drum is rotated, that is, the rotating direction (the arrow a direction in the drawing) of the conveyor belt 21 is set as a first scanning direction (first direction).

Around the respective photosensitive drums 61y, 61m, 61c, 61k, charging units 62y, 62m, 62c, 62k used as charging means formed to extend in the main scanning direction, discharging units 63y, 63m, 63c, 63k, developing rollers 64y, 64m, 64c, 64k used as developing means formed to extend in the main scanning direction, lower stirring rollers 67y, 67m, 67c, 67k, upper stirring rollers 68y, 68m, 68c, 68k, image transferring units 93y, 93m, 93c, 93k used as image transferring means formed to extend in the main scanning direction, cleaning blades 65y, 65m, 65c, 65k formed to extend in the main scanning direction, and removed toner collection screws 66y, 66m, 66c, 66k are sequentially arranged in the rotating direction of the respective photosensitive drums.

The image transferring units are arranged in position to sandwich the conveyor belt 21 together with the respective photosensitive drums, that is, they are disposed inside the conveyor belt 21. Further, an exposed portion by an exposure unit which will be described later is formed on the outer surface of the photosensitive drum between the charging unit and the developing roller.

Below the feeding mechanism 20, paper cassettes 22a, 22b for receiving a plurality of sheets of recording paper P used as image recording medium onto which images formed by the image forming sections 10y, 10m, 10c, 10k are transferred are disposed.

On one-side end portions of the paper cassettes 22a, 22b lying near the driven roller 92, pickup rollers 23a, 23b for taking out the sheets of recording paper P (from the top) received in the paper cassettes 22a, 22b one at a time are disposed. A resist roller 24 for aligning the front end of the recording paper P taken out from the paper cassette 22a, 22b with the front end of a y-toner image formed on the photosensitive drum 61y of the image forming section 10y is disposed between the pickup rollers 23a, 23b and the driven roller 92. Further, toner images (m, c, k) formed on the other photosensitive drums 61m, 61c, 61k are supplied to image transferring positions in synchronism with the feeding timings of the recording paper P fed on the conveyor belt 21.

An attraction roller 26 for applying a preset electrostatic attraction force to the recording paper P fed at preset timing via the resist roller is disposed between the resist roller 24 and the image forming section 10y and near the driven roller 92, or substantially on the outer surface of the driven roller 92 with the conveyor belt 21 disposed therebetween. The axis of the attraction roller 26 and the axis of the driven roller 92 are set in parallel to each other.

A positional deviation sensor 96 for detecting the position of an image formed on the conveyor belt 21 is disposed at a preset distance from the driven roller 92 and near the driving roller 91 or substantially on the outer surface of the driving roller 91 with the conveyor belt 21 disposed therebetween on one end portion of the conveyor belt 21. The positional deviation sensor 96 is constructed by a transmission type or reflection type optical sensor.

A conveyor belt cleaning unit 95 for removing paper dust of the recording paper P or toner attached to the conveyor belt 21 is disposed on a portion of the conveyor belt 21 which lies on the outer surface of the driving roller 91 and is set on the downstream side of the positional deviation sensor 96.

A fixing unit 80 for melting the toner image transferred on the recording paper P by heating the recording paper P to a preset temperature to fix the toner image on the recording paper P is disposed in position to which the recording paper P fed via the conveyor belt 21 and separated from the driving roller 91 is transferred. The fixing unit 80 includes a heat roller pair 81, oil coating rollers 82, 83, web take-up roller 84, web roller 85, and web pressing roller 86. The toner image formed on the recording paper is fixed on the recording paper and the recording paper is discharged via a paper discharging roller pair 87.

An exposure unit 50 for forming electrostatic latent images subjected to color separation on the outer surfaces of the respective photosensitive drums includes a semiconductor laser 60 whose light emitting operation is controlled according to image data items (y, m, c, k) of respective colors separated by an image processing device which will be described later. A polygon mirror 51 rotated by a polygon motor 54 to reflect and scan the laser beam and f θ lenses 52, 53 for correcting the focus of the laser beam reflected from the polygon mirror 51 and forming the image are sequentially arranged on the optical path of the semiconductor laser 60.

First reflecting mirrors 55 (y, m, c, k) for reflecting the laser beams of respective colors which have passed through the f θ lens 53 to the exposure positions of the respective photosensitive drums and second and third reflecting mirrors 56 (y, m, c) and 57 (y, m, c) for further reflecting the laser beams reflected from the first reflecting mirrors 55y, 55m, 55c are disposed between the f θ lens 53 and the respective photosensitive drums 61y, 61m, 61c, 61k. The laser beam for black is guided to the photosensitive drum 61k without passing through another mirror after reflected from the first reflecting mirror 55k.

Figure 2:
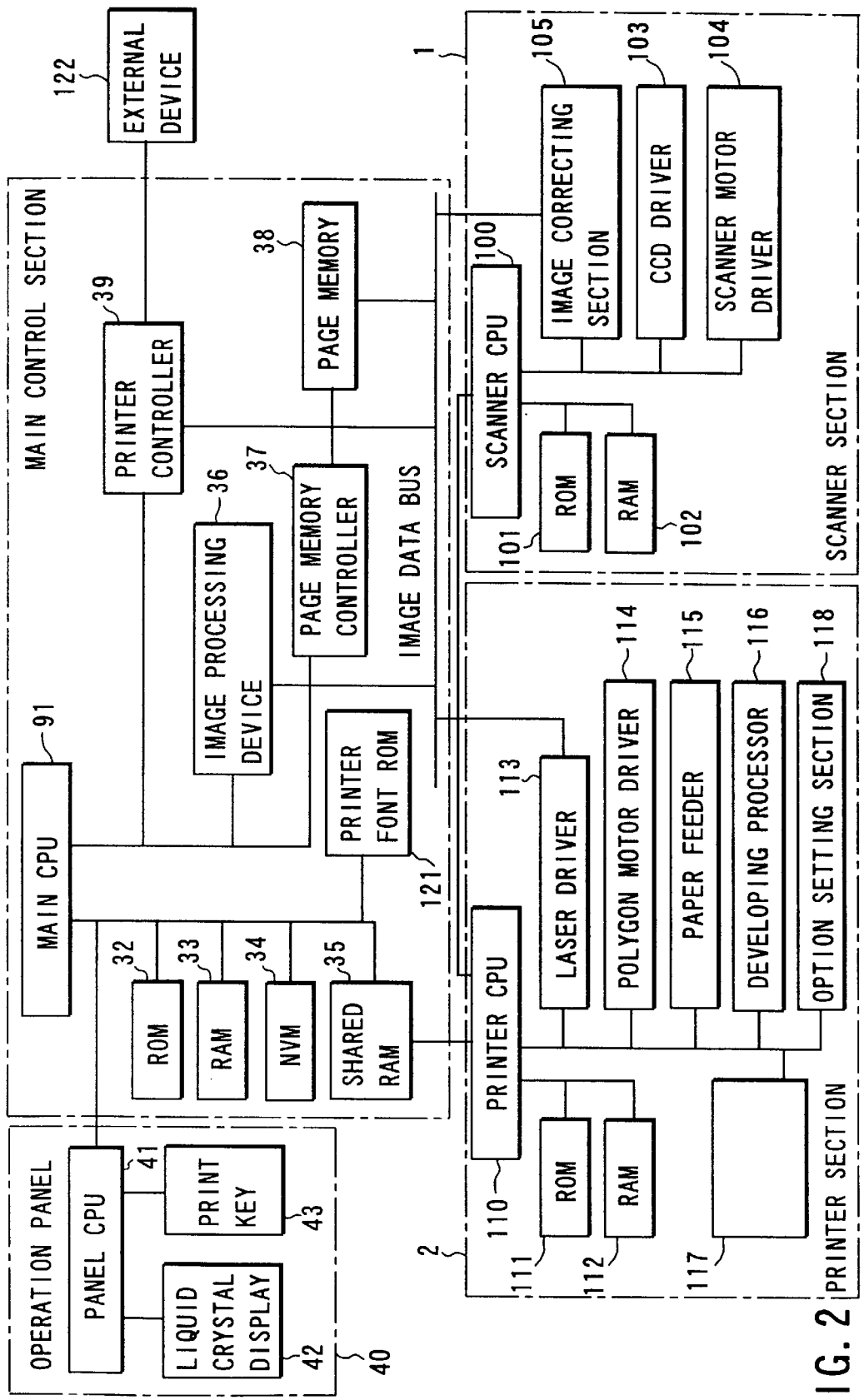
FIG. 2 is a block diagram showing the schematic construction of the digital color copying machine.

FIG. 2 is a block diagram schematically showing the flow of controlling signals and the electrical connection of the digital color copying machine of FIG. 1. In an example of the digital color copying machine shown in FIG. 2, three CPUs including a main CPU 31 in a main control section 30, a scanner CPU 100 of the scanner section 1 and a printer CPU 110 of the printer section 2 are provided. The main CPU 31 effects the bi-directional communication with respect to the printer CPU 110 via a shared RAM 35, and the main CPU 31 issues an operation instruction and the printer CPU 110 returns a state status. The printer CPU 110 and the scanner CPU 100 effect the serial communication, and the printer CPU 110 issues an operation instruction and the scanner CPU 100 returns a state status.

An operation panel 40 includes a panel CPU 41 connected to the main CPU 31 for controlling the whole portion thereof, a liquid crystal display 42 and a print key 43.

The main control section 30 includes the main CPU 31, ROM 32, RAM 33, NVM (nonvolatile RAM) 34, shared RAM 35, image processing device 36, page memory control section 37, page memory 38, printer controller 39 and printer font ROM 121.

The main CPU 31 controls the whole portion of the main control section 30. The ROM 32 stores control programs. The RAM 33 temporarily stores data.

The NVM 34 is a nonvolatile memory backed up by a battery (not shown) and continuously holds data of the NVM 34 even after the power supply is turned OFF.

The shared RAM 35 is used to permit bi-directional communication between the main CPU 31 and the printer CPU 110.

The page memory control section 37 effects the control operation to store or read out image data into or from the page memory 38. The page memory 38 has a storage area capable of storing image data of a plurality of pages and is formed to store data obtained by compressing image data from the scanner section 1 for each page.

In the printer font ROM 121, font data corresponding to print data is stored.

The printer controller 39 develops print data from an external device 122 such as a personal computer into image data by use of font data stored in the printer font ROM 121 with resolution corresponding to data indicating the resolution attached to the print data.

The scanner section 1 includes the scanner CPU 100 for controlling the whole portion of the scanner section 1, a ROM 101 in which a control program and the like are stored, a data storage RAM 102, a CCD driver 103 for driving the CCD image sensor 15, a scan motor driver 104 for controlling the rotation of motors for driving the exposure lamp 5 and mirrors 7, 11, 12 and the like, and an image correcting section 105 including an A/D converting circuit for converting an analog signal from the CCD image sensor 15 into a digital signal, a shading correction circuit for correcting a variation in the threshold level with respect to the output signal of the CCD image sensor 15 caused by a change in the ambient temperature or a fluctuation in the characteristic of the CCD image sensor 15, and a line memory for temporarily storing the digital signal subjected to the shading correction and supplied from the shading correction circuit.

The printer section 2 includes the printer CPU 110 for controlling the whole portion of the printer section 2, a ROM 111 in which a control program and the like are stored, a data storage RAM 112, a laser driver 113 for turning ON/OFF the light emitting operation of the semiconductor laser 60, a polygon motor driver 114 for controlling the rotation of the polygon motor 54 of the exposure unit 50, a paper feeding section 115 for controlling the operation for feeding the recording paper P by the feeding mechanism 20, a developing process section 116 for effecting the charging, developing and transferring processes by use of the charging units 62y, 62m, 62c, 62k, developing rollers 64y, 64m, 64c, 64k and transferring units 93y, 93m, 93c, 93k, a fixing control section 117 for controlling the fixing unit 80, and an option setting section 118.

Further, the image forming device 36, page memory 38, printer controller 39, image correcting section 105 and laser driver 113 are connected via an image data bus 120.

Next, a first embodiment of this invention is explained.

Figure 3:
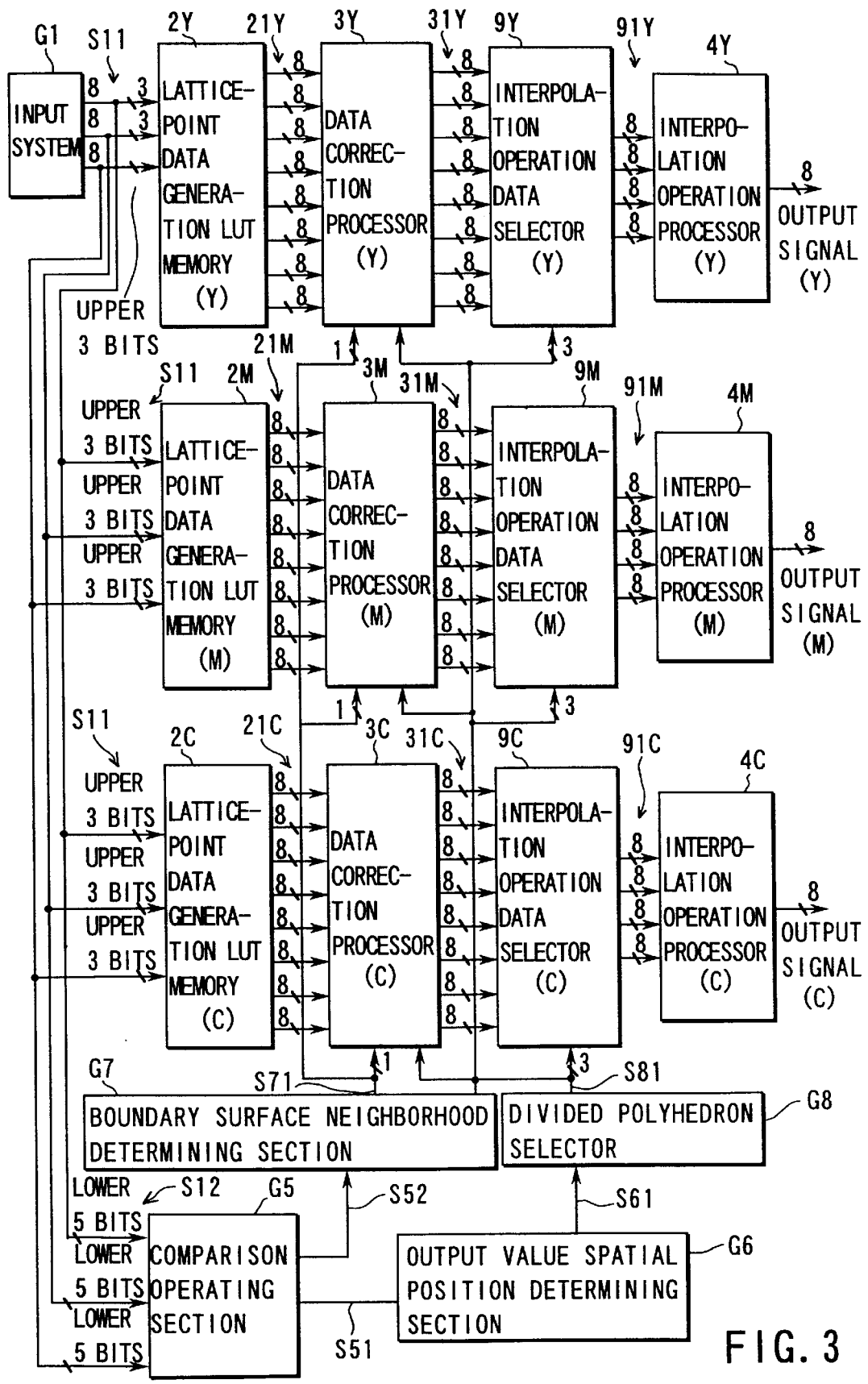
FIG. 3 is a diagram showing the construction of an image processing apparatus.

FIG. 3 shows the construction of the image forming device 36. The image processing device 36 includes an input system G1 for supplying an image input from the scanner section 1, a comparison operating section G5 used as comparison operating means for comparing the magnitudes of the lower five bits S12 of 8-bit 3-dimensional color space RGB signals, a spatial position determining section G6 used as determining means for deriving a spatial position of a to-be-derived output value from an output signal S51 indicating the result of magnitude comparison by the comparison operating section G5 and determining spatial coordinate data S61, a divided tetrahedron selecting section G8 for selecting a divided tetrahedron containing a to-be-derived output value based on the spatial coordinate data S61 and outputting a 3-bit output signal S81 representing the selected divided tetrahedron, a boundary surface neighborhood determining section G7 used as determining means for determining whether or not the to-be-derived output value is present near the divided boundary surface based on the output signal S52 indicating the result of magnitude comparison by the comparison operating section G5 and outputting a 1-bit determination result signal S71, LUT memories 2Y, 2M, 2C used as storage means for outputting lattice-point data from the upper 3-bit signals S11 of the 3-dimensional color space RGB signals of the input image, data correction processing sections 3Y, 3M, 3C used as correcting means for correcting eight 8-bit lattice-point data items (P0 to P7), that is, 21Y, 21M, 21C output from each of the LUT memories 2Y, 2M, 2C by use of the determination result S71, selecting sections 9Y, 9M, 9C for selecting 8-bit data for interpolation operation from the corrected 8-bit lattice-point data items (P0' to P7'), that is, 31Y, 31M, 31C according to the output signal S81 representing a divided tetrahedron, and interpolation operation processing sections 4Y, 4M, 4C used as interpolation operation means for effecting the interpolation for the selected data 91Y, 91M, 91C.

In this embodiment, the divided tetrahedron is explained as an example, but it is of course possible to use a method for dividing the unit cube into pentahedrons and a method for dividing the unit cube into hexahedrons if they are the interpolation operation method for dividing the unit cube.

Figure 4:
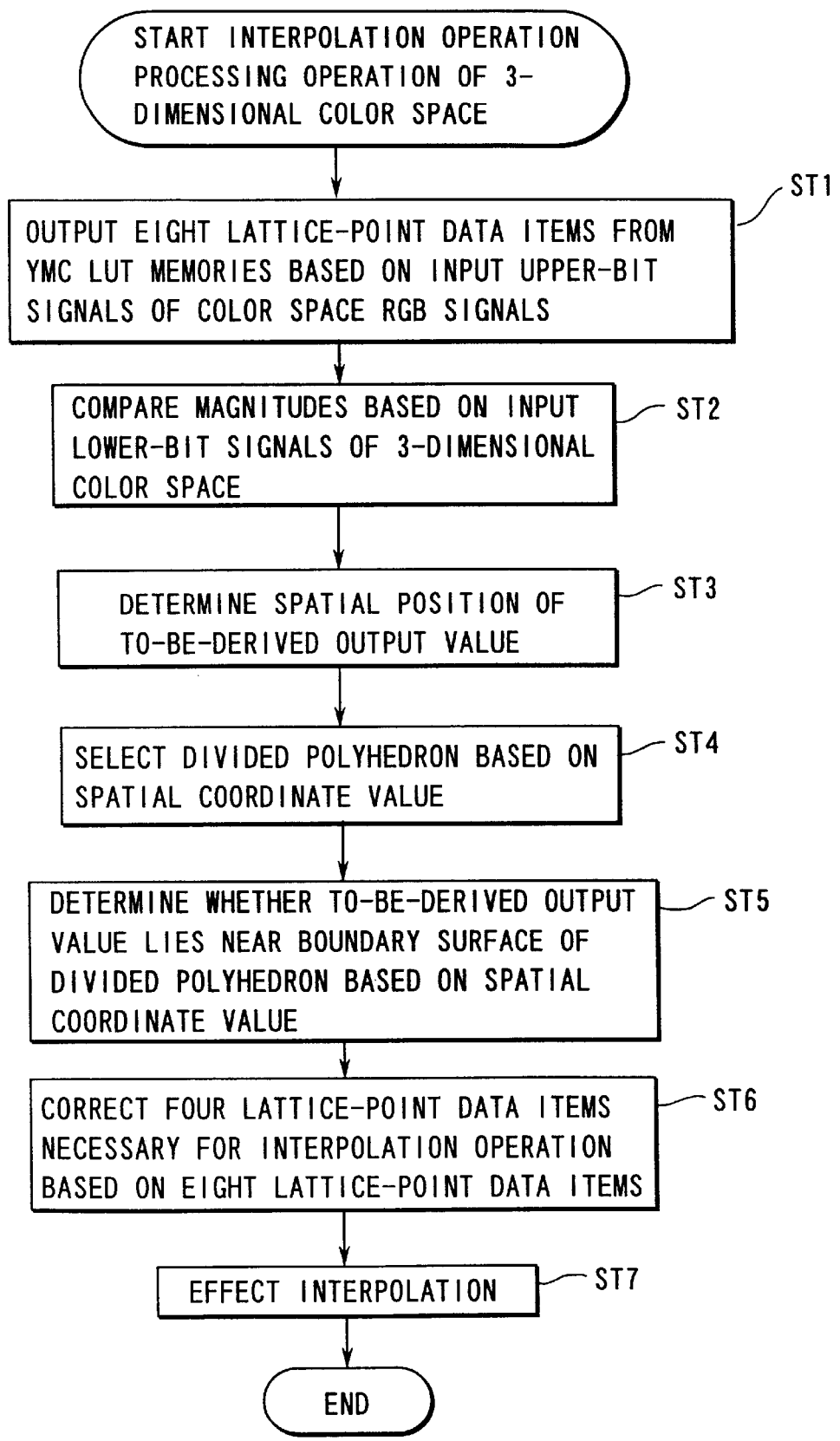
FIG. 4 is a flowchart for illustrating the operation of a 3-dimensional color space interpolation method for color conversion in a first embodiment of this invention.

Next, with the above construction, the schematic operation of the interpolation method for the 3-dimensional color space for color conversion in the first embodiment is explained with reference to the flowchart of FIG. 4. The unit cube is shown in FIG. 20 and the image diagram of a divided tetrahedron and a selection method for the divided tetrahedron are shown in FIGS. 21A and 21B.

A unit cube Q is selected by upper 3-bit signals S11 of 3-dimensional color space signals input from the input system G1. In FIG. 20, a unit cube of R=111, G=000 and B=111 is selected as an example. Eight lattice-point data items (P0 to P7), that is, 21Y, 21M, 21C of the unit cube Q are output from the LUT memories 2Y, 2M, 2C (ST1). In this case, each lattice-point data item is indicated by eight bits.

The lower 5-bit signals S12 of the input 3-dimensional color space RGB signals are subjected to magnitude comparison based on the determination condition (r≧b, b>g, g>r) shown in FIG. 21B in the comparison operating section G5 (ST2). The output value spatial position determining section G6 determines the spatial coordinate position of a to-be-derived output value as spatial coordinate data S61 based on the comparison result S51 (ST3). The divided polyhedron selecting section G8 selects a divided polyhedron q2 on which the to-be-derived output value lies by use of the spatial coordinate data S61 (ST4) and outputs a signal S81 representing the divided polyhedron q2.

As shown in FIGS. 21A and 21B, when r>b, g>b, r>g, a divided tetrahedron having vertices of P5-P0-P3-P2 is selected. At the same time, whether or not the to-be-derived output value is present near the boundary surface of the selected divided tetrahedron is determined based on the comparison result of the comparison operating section G5 by use of the boundary surface neighborhood determining section G7 and then the determination result S71 is output (ST5).

In a case where the signal S71 is output and it is determined that the to-be-derived output value is present near the boundary surface, the lattice-point data items 21Y, 21M, 21C are corrected as will be described later by the data correction processing sections 3Y, 3M, 3C (ST6).

Then, the interpolation operation data selecting sections 9Y, 9M, 9C select and output data items 91Y, 91M, 91C necessary for interpolation from the corrected lattice-point data items (P0' to P7'), that is, 31Y, 31M, 31C based on the selection result 81. The interpolation operation processing sections 4Y, 4M, 4C effect the interpolation operations by use of the selected data items 91Y, 91M, 91C and output 8-bit output signals (Y), (M), (C) (ST7).

Next, each block in the construction shown in FIG. 3 is explained.

Figure 5:
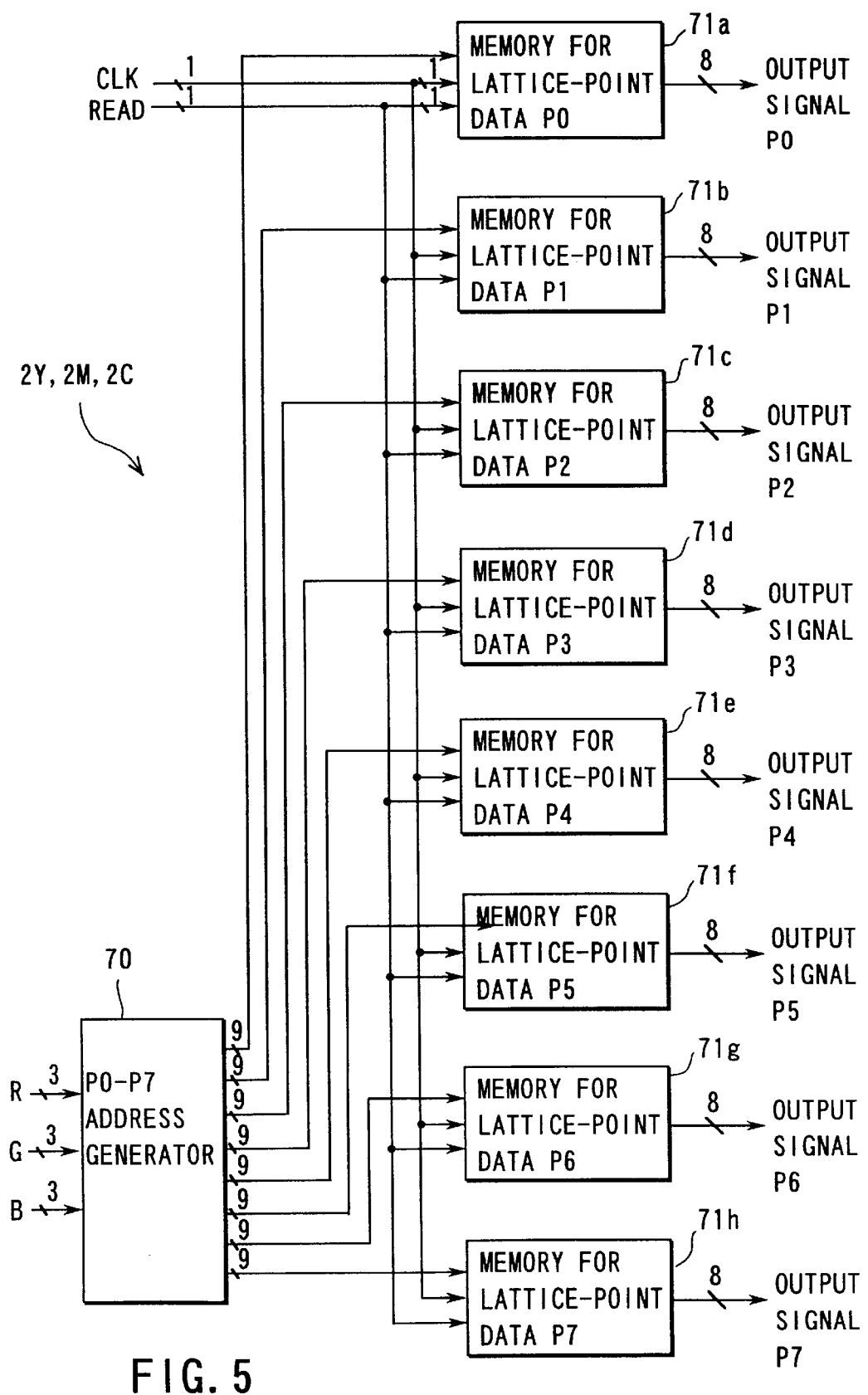
FIG. 5 is a diagram showing the construction of an LUT memory for generating lattice-point data.

FIG. 5 shows the construction of each of the LUT memories 2Y, 2M, 2C for generating lattice-point data items (P0 to P7). Each LUT memory includes a P0–P7 address generator 70, a lattice-point data P0 memory 71a, lattice-point data P1 memory 71b, lattice-point data P2 memory 71c, lattice-point data P3 memory 71d, lattice-point data P4 memory 71e, lattice-point data P5 memory 71f, lattice-point data P6 memory 71g, and lattice-point data P7 memory 71h.

Figure 6:
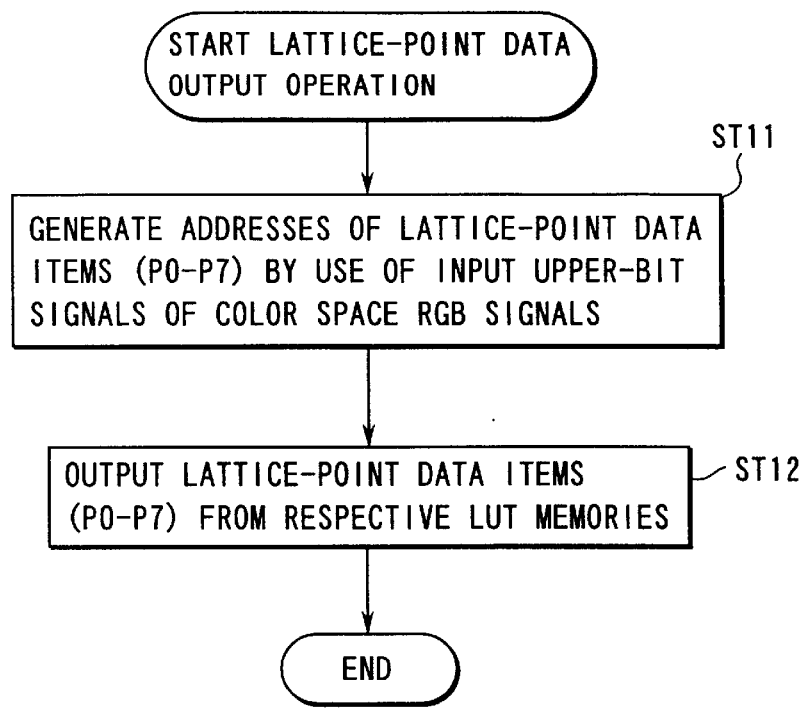
FIG. 6 is a flowchart for illustrating the operation of the LUT memory.

FIG. 6 is a flowchart for illustrating the operations of the LUT memories 2Y, 2M, 2C. FIGS. 7A to 7E shows operation timings of the LUT memory section in the image processing section 36 of this embodiment.

HDEN shown in FIG. 7A is an image effective interval signal and only image data in an interval of "0" becomes effective. CLK shown in FIG. 7B is an image transfer clock and image data is changed at the fall timing of "1"→"0". The R, G, B signals shown in FIG. 7C are upper 3-bit signals S11 of the 3-dimensional color space RGB signals, a 9-bit address signal is created based on the upper 3-bit RGB signals in the address generator 70 (ST11), and lattice-point data items P0 to P7 are respectively output from the memories 71a to 71h (ST12). In this case, all of the eight 9-bit addresses are the same address.

Next, the boundary surface neighborhood selecting process is explained.

Figure 8:
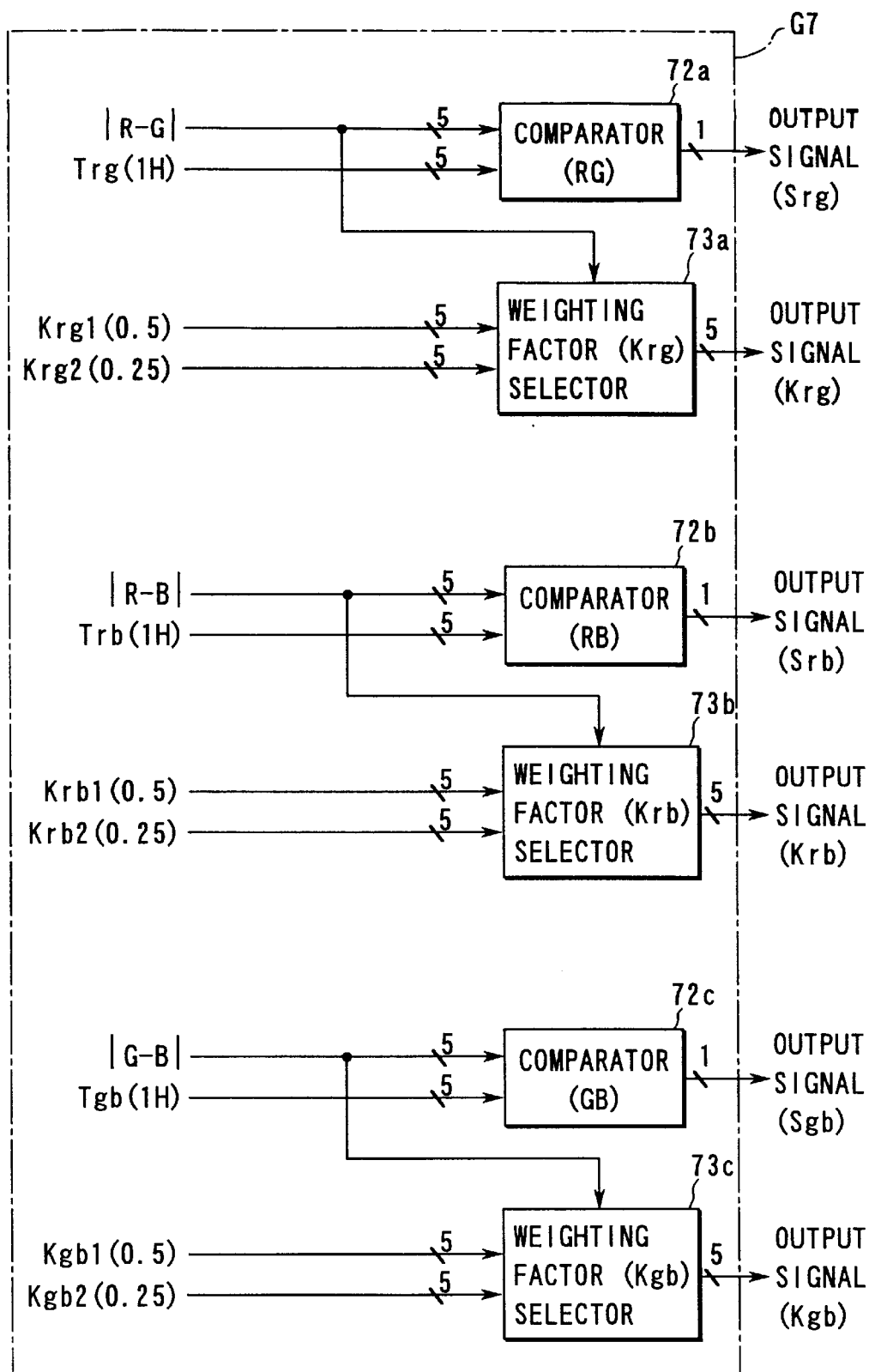
FIG. 8 is a diagram showing the schematic construction of a boundary surface neighborhood determining section.

FIG. 8 shows the schematic construction of the boundary surface neighborhood determining section G7. The boundary surface neighborhood determining section G7 includes a comparator 72a and weighting factor selecting section 73a, a comparator 72b and weighting factor selecting section 73b, and a comparator 72c and weighting factor selecting section 73c.

Figure 9:
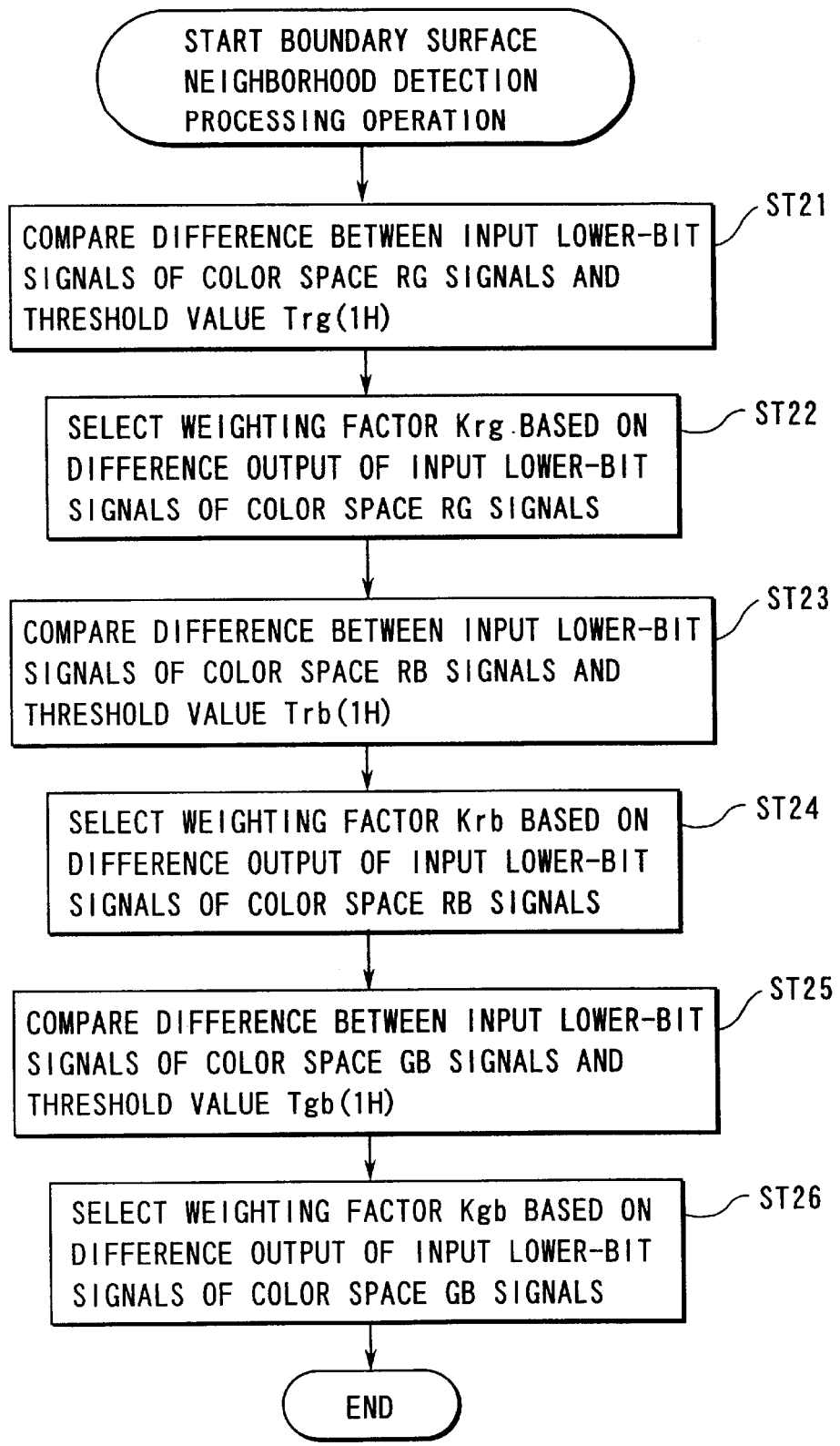
FIG. 9 is a flowchart for illustrating the operation of a boundary surface neighborhood detecting process.

FIG. 9 is a flowchart showing the operation of the boundary surface neighborhood detecting process. The comparator 72a compares a difference between the input lower 5-bit signals of the color space RG signals input from the comparison operating section G5 and a threshold value Trg (for example, 1 H), determines that a to-be-derived output value lies near the boundary surface if the difference value is not larger than the threshold value, and outputs a 1-bit output signal Srg as the comparison result (ST21). The weighting factor selecting section 73a selects and outputs a weighting factor Krg which is set at 0.5 when the difference output of the input lower 5-bit signals of the color space RG signals is 0 H and which is set at 0.25 when the difference output is 1 H (ST22).

In this embodiment, the threshold value Trg is set at 1 H and Krg is set at 0.5 or 0.25, but since the input RG signals are lower 5-bit signals, the RG signal difference value is set in the range of 0 to 31, the threshold value Trg can be set in the above range, and the weighting factor Krg can be freely set. Further, if the number of bits of an input signal is increased, the numbers of settable values of the threshold value Trg and weighting factor Krg are naturally increased. However, it is desirable to set the threshold value Trg to a value of 1 or 2 and set the weighting factor Krg to a value of 2 to the n-th power (in this example, ½ to the n-th power) when taking the circuit scale into consideration.

The comparator 72b compares a difference between the input lower 5-bit signals of the color space RB signals and a threshold value Trb (1H) by use of the input 3-dimensional RGB signals, determines that a to-be-derived output value lies near the boundary surface if the difference value is not larger than the threshold value, and outputs a 1-bit output signal Srb as the comparison result (ST23). The weighting factor selecting section 73b selects and outputs a weighting factor Krb which is set at 0.5 when the difference output of the input lower 5-bit signals of the color space RB signals is 0 and which is set at 0.25 when the difference output is 1 (ST24).

The above conditions used for setting the threshold value Trg and the weighting factor Krg can also be applied to the threshold value Trb and the weighting factor Krb. The comparator 72c compares a difference between the input lower 5-bit signals of the color space GB signals and a threshold value Tgb (1 H) by use of the input 3-dimensional RGB signals, determines that a to-be-derived output value lies near the boundary surface if the difference value is not larger than the threshold value, and outputs a 1-bit output signal Sgb as the comparison result (ST25).

Further, the weighting factor selecting section 73c selects and outputs a weighting factor Kgb which is set at 0.5 when the difference output of the input lower 5-bit signals of the color space GB signals is 0 and which is set at 0.25 when the difference output is 1 (ST26). The above conditions used for setting the threshold value Trg and the weighting factor Krg can also be applied to the threshold value Tgb and the weighting factor Kgb.

Next, the data correction process is explained.

Figure 10:
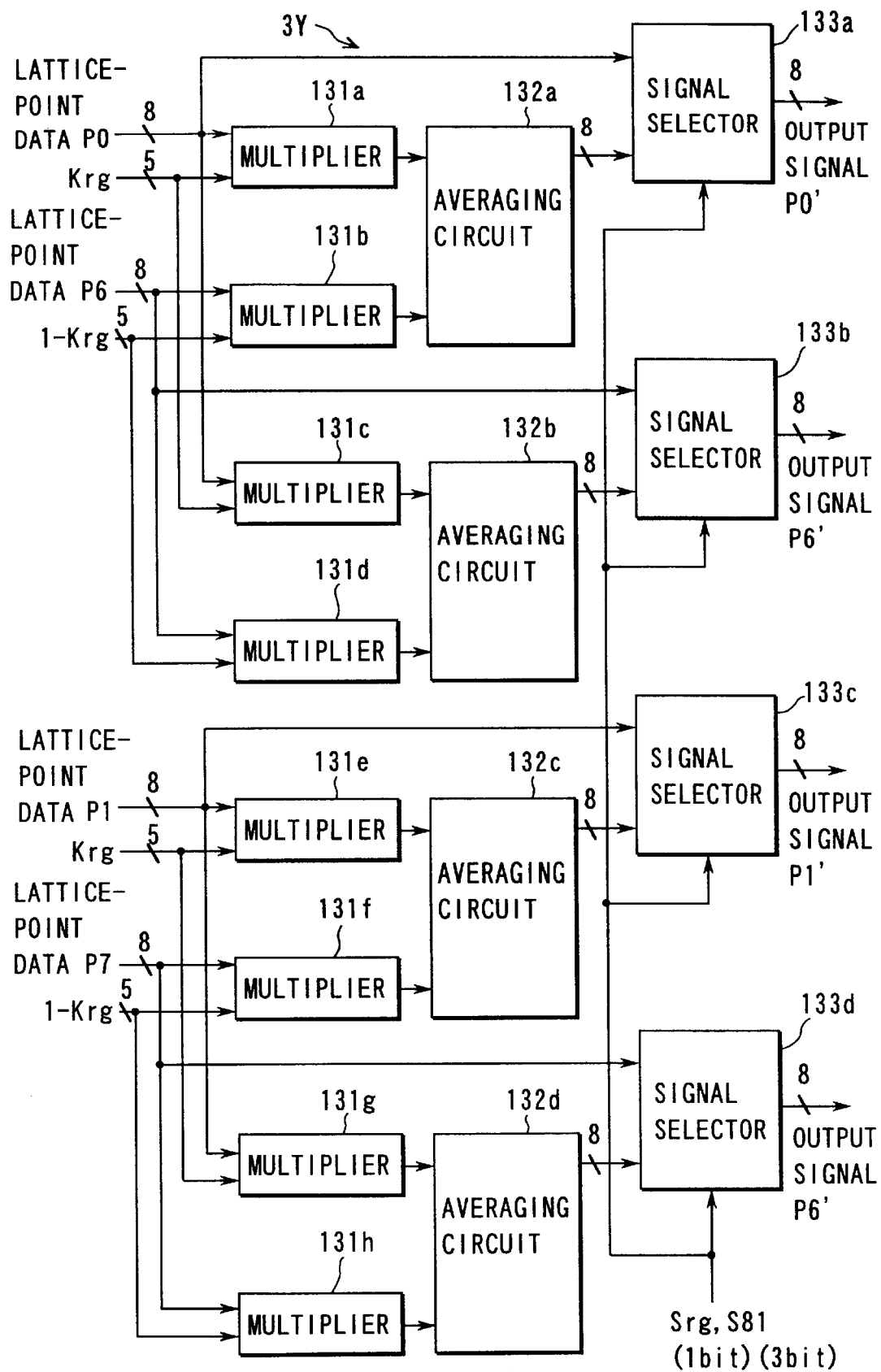
FIG. 10 is a diagram showing the construction of a data correction processing section.
Figure 11:
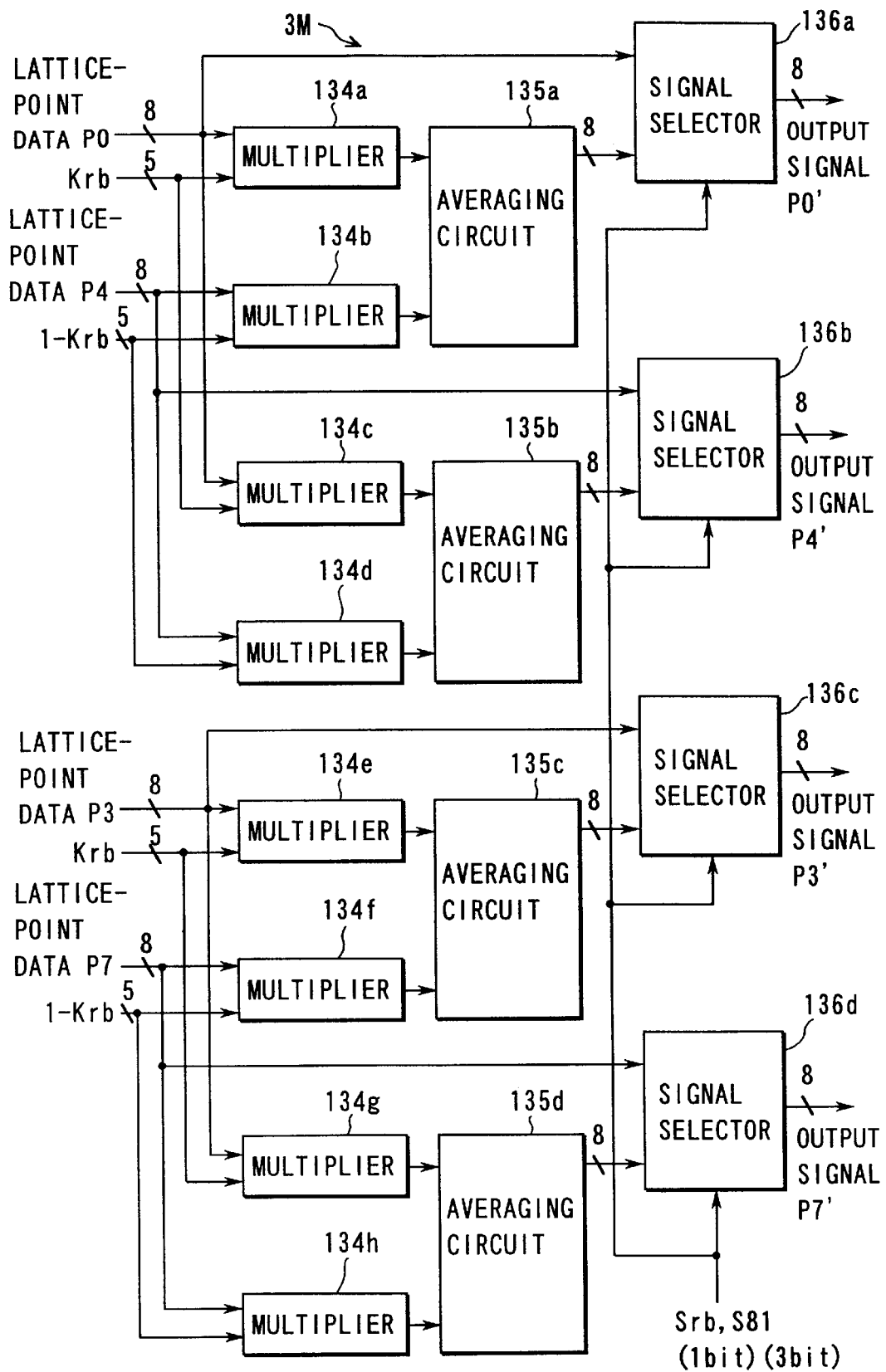
FIG. 11 is a diagram showing the construction of the data correction processing section.
Figure 12:
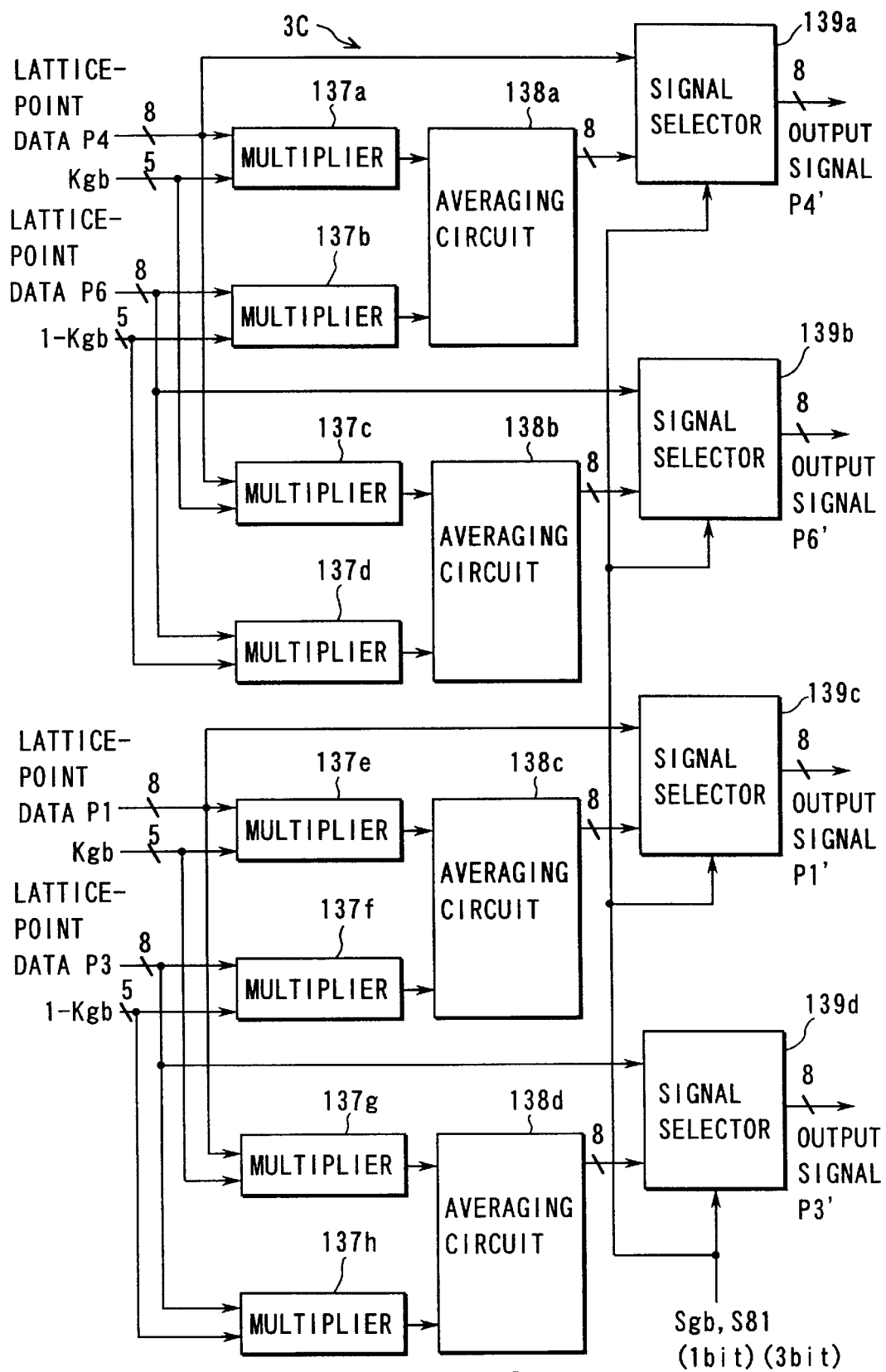
FIG. 12 is a diagram showing the construction of the data correction processing section.

FIGS. 10, 11, 12 respectively show the constructions of the data correction processing sections 3Y, 3M, 3C. More specifically, the data correction processing section 3Y includes multipliers 131a to 131h, averaging circuits 132a to 132d and signal selecting sections 133a to 133d. The data correction processing section 3M includes multipliers 134a to 134h, averaging circuits 135a to 135d and signal selecting sections 136a to 136d. The data correction processing section 3C includes multipliers 137a to 137h, averaging circuits 138a to 138d and signal selecting sections 139a to 139d.

In the case of FIG. 10, the following equation is calculated according to the input lattice-point data items P0, P6 and Krg, (1−Krg) by use of the multipliers 131a, 131b and the averaging circuit 132a.

$$P0'=(Krg*P0+(1-Krg)*P6)/2$$

The following equation is calculated by use of the multipliers 131c, 131d and the averaging circuit 132b.

$$P6'=(Krg*P6+(1-Krg)*P0)/2$$

Further, the following equation is calculated according to the input lattice-point data items P1, P7 and Krg, (1−Krg) by use of the multipliers 131e, 131f and the averaging circuit 132c.

$$P1'=(Krg*P1+(1-Krg)*P7)/2$$

The following equation is calculated by use of the multipliers 131g, 131h and the averaging circuit 132d.

$$P7'=(Krg*P7+(1-Krg)*P1)/2$$

In the case of FIG. 11, the following equation is calculated according to the input lattice-point data items P0, P4 and Krb, (1−Krb) by use of the multipliers 134a, 134b and the averaging circuit 135a.

$$P0'=(Krb*P0+(1-Krb)*P4)/2$$

The following equation is calculated by use of the multipliers 134c, 134d and the averaging circuit 135b.

$$P4'=(Krg*P4+(1-Krg)*P0)/2$$

Further, the following equation is calculated according to the input lattice-point data items P3, P7 and Krb, (1−Krb) by use of the multipliers 134e, 134f and the averaging circuit 135c.

$$P3'=(Krg*P3+(1-Krb)*P7)/2$$

The following equation is calculated by use of the multipliers 134g, 134h and the averaging circuit 135d.

$$P7'=(Krg*P7+(1-Krb)*P3)/2$$

In the case of FIG. 12, the following equation is calculated according to the input lattice-point data items P4, P6 and Kgb, (1−Kgb) by use of the multipliers 137a, 137b and the averaging circuit 138a.

$$P4'=(Kgb*P4+(1-Kgb)*P6)/2$$

The following equation is calculated by use of the multipliers 137c, 137d and the averaging circuit 138b.

$$P6'=(Kgb*P6+(1-Kgb)*P4)/2$$

Further, the following equation is calculated according to the input lattice-point data items P1, P3 and Kgb, (1−Kgb) by use of the multipliers 137e, 137f and the averaging circuit 138c.

$$P1'=(Kgb*P1+(1-Kgb)*P3)/2$$

The following equation is calculated by use of the multipliers 137g, 137h and the averaging circuit 138d.

$$P3'=(Kgb*P3+(1-Kgb)*P1)/2$$

Figure 13:
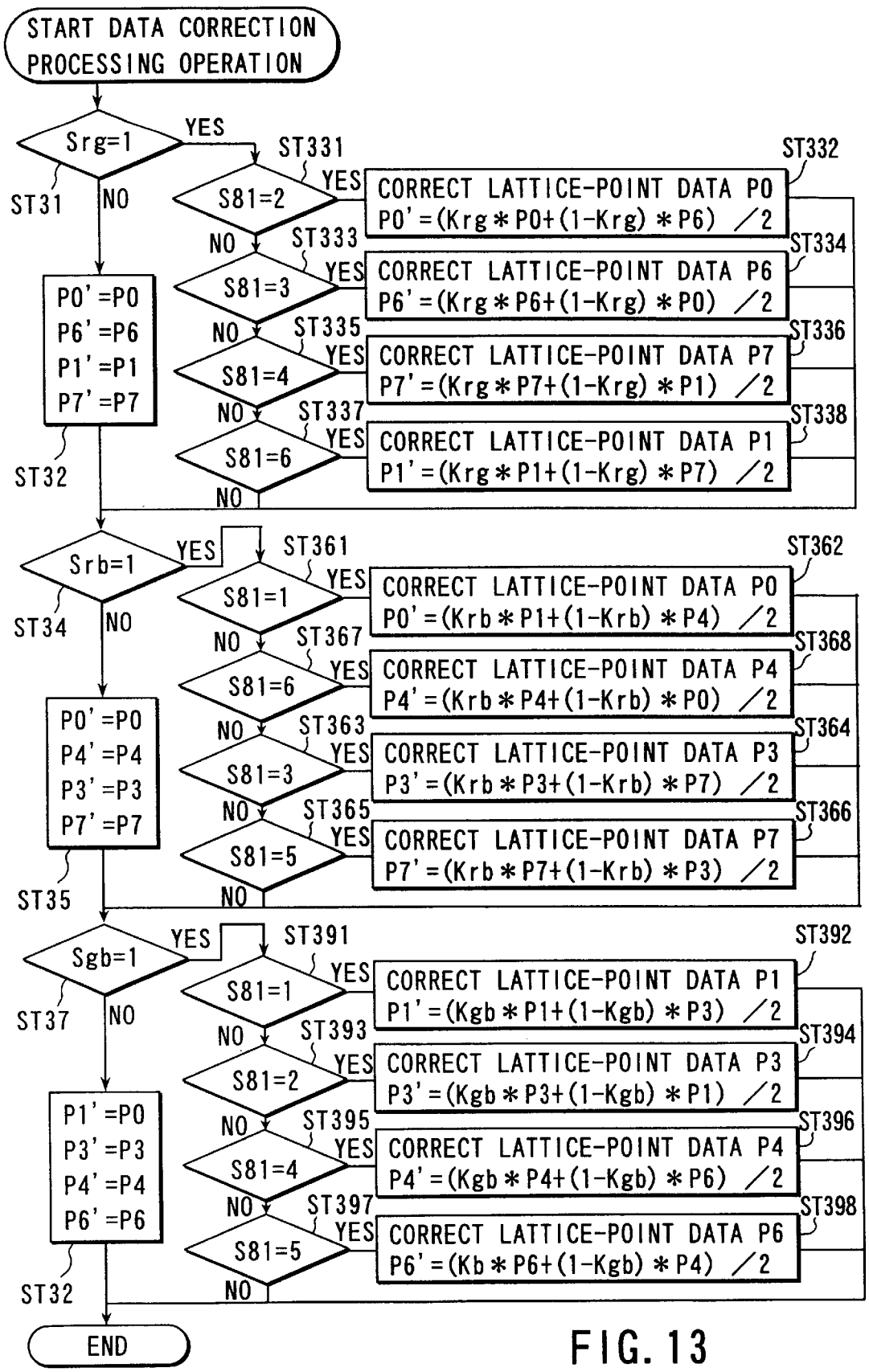
FIG. 13 is a flowchart for illustrating the operation of a data correction process.

FIG. 13 is a flowchart showing the operation of the data correction process. FIG. 22 is a view showing a divided tetrahedron q2 (P5-P0-P3-P2) projected on an RG plane. In the divided tetrahedron q2 shown in FIG. 21A, the lower 5-bit signals of the input 3-dimensional color space RGB signals are set such that r>b, g>b, r>b, and (r−b)=1 H. The boundary surface neighborhood determining section G7 (FIG. 8) determines that a to-be-derived output value lies on the boundary surface, and Srg=1 and Krg=0.5 therefrom and S81=2 (FIG. 21B) from the divided tetrahedron selecting section G8 are input to the data correction processing sections 3Y, 3M, 3C.

The data correction processing section 3Y corrects lattice-point data by use of the value of the signal S81 representing the divided tetrahedron since Srg=1 is input to the signal selecting section 133a (ST31). In the divided tetrahedron q2 shown in FIG. 21A, since S81=2 (ST331), the value of the lattice-point data P0 is corrected based on the above equation by use of the multipliers 131a, 131b and averaging circuit 132a (ST332).

In this case, if the weighting factor Krg is set to a value of 2 to the n-th power as described with reference to the boundary surface selecting section G7 (FIG. 8), the multiplier 131a can be formed of a bit shifter and the multiplier 131b can be formed of an adder, thereby making it possible to reduce the circuit scale. Further, by using the same method, the value of the lattice-point data P6 is corrected (ST334) in the case of S81=3 (in the case of a divided tetrahedron having vertices of P5-P6-P3-P2) (ST333).

The value of the lattice-point data P7 is corrected (ST336) in the case of S81=4 (in the case of a divided tetrahedron having vertices of P5-P4-P7-P2) (ST335) and the value of the lattice-point data P1 is corrected (ST338) in the case of S81=6 (divided tetrahedron having vertices of P5-P4-P1-P2) (ST337).

In a case where Srg input to the signal selecting section 133a of FIG. 10 is 0 (ST31), none of the lattice-point data items P0, P1, P6, P7 are corrected (ST32). This is because a to-be-derived output value does not lie near the boundary surface. Next, since Srb input to the signal selecting section 136a of FIG. 11 is 0 (ST34), none of the lattice-point data items P0, P3, P4, P7 are corrected (ST35).

If Srb=1 is input (ST34), the lattice-point data is corrected based on the value of the signal S81 representing the divided tetrahedron. The value of the lattice-point data P0 is corrected based on the above equation by use of the multipliers 134a, 134b and averaging circuit 135a (ST362) in the case of S81=1 (in the case of a divided tetrahedron having vertices of P5-P0-P1-P2) (ST361). The operation for setting the weighting factor Krb to a value of 2 to the n-th power to reduce the circuit scale is the same as that in the case of the data correction processing section 3Y.

The value of the lattice-point data P3 is corrected (ST364) in the case of S81=3 (in the case of a divided tetrahedron having vertices of P5-P6-P3-P2) (ST363). The value of the lattice-point data P7 is corrected (ST366) in the case of S81=5 (in the case of a divided tetrahedron having vertices of P5-P6-P7-P2) (ST365), and the value of the lattice-point data P4 is corrected (ST368) in the case of S81=6 (in the case of a divided tetrahedron having vertices of P5-P4-P1-P2) (ST367).

Since Sgb input to the signal selecting section 139a of FIG. 12 is 0 (ST37), none of the lattice-point data items P1, P3, P4, P6 are corrected (ST38).

If Sgb=1 is input (ST37), the lattice-point data is corrected based on the value of the signal S81 representing the divided tetrahedron. The value of the lattice-point data P1 is corrected based on the above equation by use of the multipliers 137a, 137b and averaging circuit 138a (ST392) in the case of S81=1 (in the case of a divided tetrahedron having vertices of P5-P0-P1-P2) (ST391). The operation for setting the weighting factor Kgb to a value of 2 to the n-th power to reduce the circuit scale is the same as that in the case of the data correction processing section 3Y.

The value of the lattice-point data P3 is corrected (ST394) in the case of S81=2 (in the case of a divided tetrahedron having vertices of P5-P0-P3-P2) (ST393). The value of the lattice-point data P4 is corrected (ST396) in the case of S81=4 (in the case of a divided tetrahedron having vertices of P5-P4-P7-P2) (ST395), and the value of the lattice-point data P6 is corrected (ST398) in the case of S81=5 (in the case of a divided tetrahedron having vertices of P5-P6-P7-P2) (ST397).

Next, a second embodiment of this invention is explained.

Figure 14:
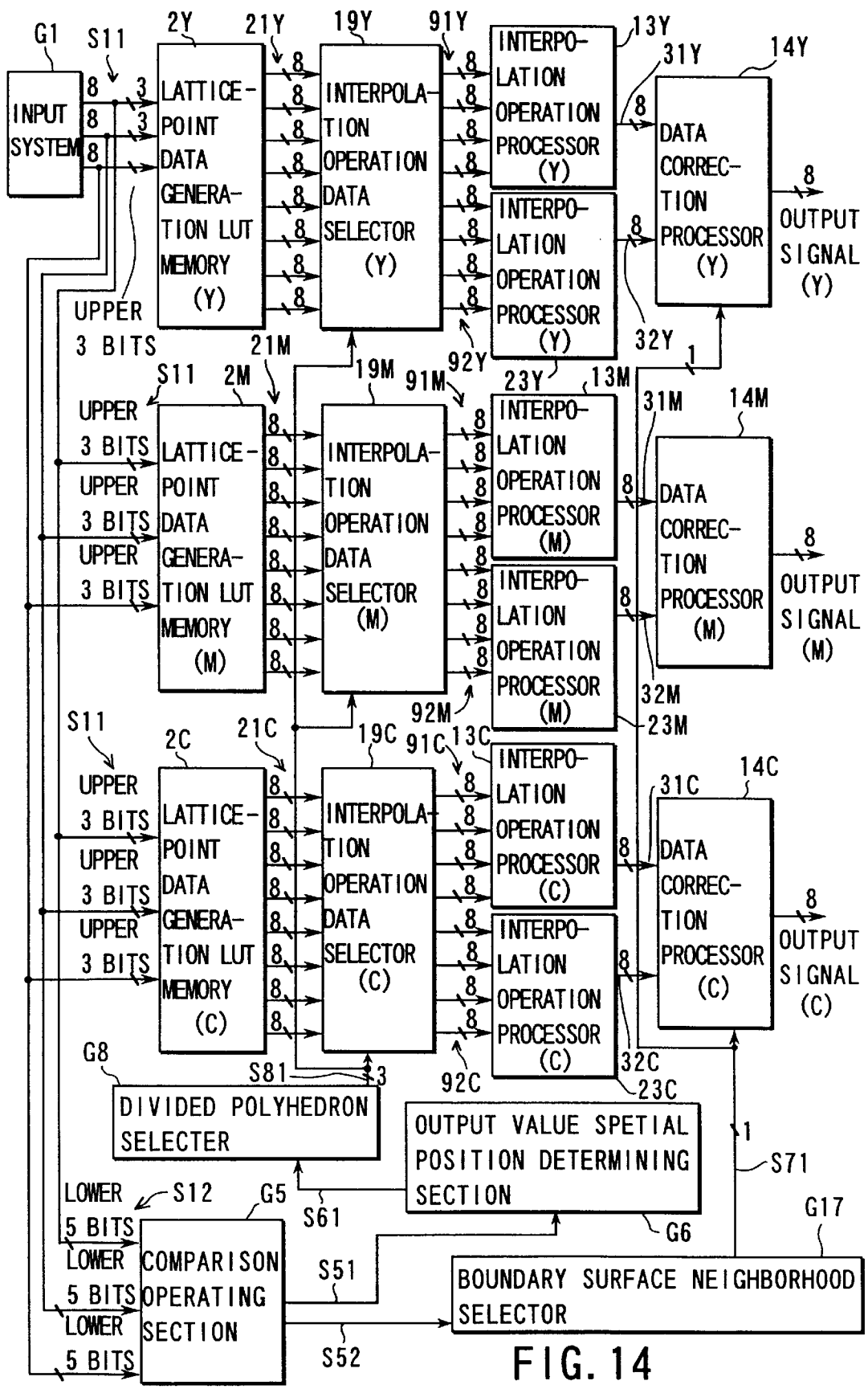
FIG. 14 is a diagram showing another construction of the image processing apparatus.

FIG. 14 shows another construction of the image processing device 36. Portions which are the same as those in the first embodiment are denoted by use of the same reference numerals and the explanation therefor is omitted. The image processing device 36 in the second embodiment includes an input system G1 for supplying an image input from a scanner section 1 or the like, a comparison operating section G5 for comparing the magnitudes of the lower five bits S12 of 3-dimensional color space RGB signals of an 8-bit input image, a spatial position determining section G6 for deriving a spatial position of a to-be-derived output value from a 1-bit output signal S51 indicating the result of magnitude comparison by the comparison operating section G5 and determining spatial coordinate data S61, a divided tetrahedron selecting section G8 for selecting a divided tetrahedron containing the to-be-derived output value based on the spatial coordinate data S61 and outputting a 3-bit output signal S81 representing the divided tetrahedron, a boundary surface neighborhood determining section G17 for outputting a 1-bit determination result signal S71 indicating that the to-be-derived output value is present near the divided boundary surface or not based on the output signal S52 indicating the result of magnitude comparison by the comparison operating section G5, LUT memories 2Y, 2M, 2C for outputting lattice-point data from the upper 3-bit signals S11 of the 3-dimensional color space RGB signals of the input image, selecting sections 19Y, 19M, 19C for selecting interpolation operating data based on eight 8-bit lattice-point data items (P0 to P7), that is, 21Y, 21M, 21C respectively output from the LUT memories 2Y, 2M, 2C according to the output signal S81 representing the divided tetrahedron, interpolation operation processing sections 13Y, 23Y, 13M, 23M, 13C, 23C for receiving selected 8-bit interpolation operation data items 91Y, 92Y, 91M, 92M, 91C, 92C and effecting the interpolation operation processes, and data correction processing sections 14Y, 14M, 14C for correcting 8-bit output data items 31Y, 32Y, 31M, 32M, 31C, 32C subjected to the interpolation operation process by use of the determination result S71.

Figure 15:
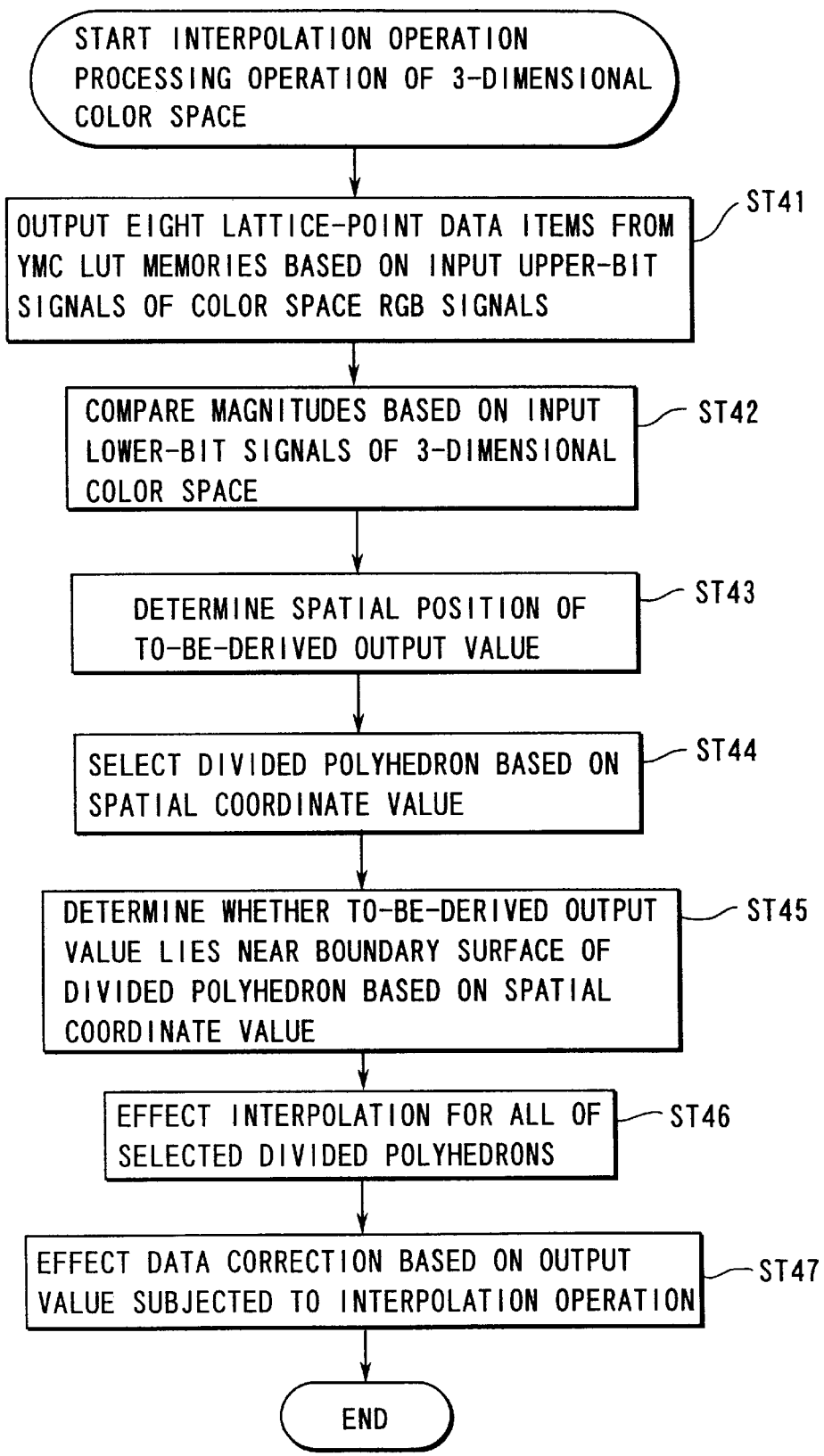
FIG. 15 is a flowchart for illustrating the operation of a 3-dimensional color space interpolation method for color conversion in an embodiment of FIG. 14.

Next, with the above construction, the operation of the 3-dimensional color space interpolation method for color conversion in the second embodiment is explained with reference to the flowchart of FIG. 15.

Eight lattice-point data items (P0 to P7), that is, 21Y, 21M, 21C of a unit cube are output from the LUT memories 2Y, 2M, 2C (ST41) according to upper 3-bit signals S11 of 3-dimensional color space signals input from the input system G1. The lower 5-bit signals S12 of the input 3-dimensional color space RGB signals are subjected to magnitude comparison in the comparison operating section G5 (ST42), and the spatial position coordinate of a to-be-derived output value is determined as spatial coordinate data S61 by the output value spatial position determining section G6 (ST43). The divided polyhedron selecting section G8 selects a divided polyhedron on which the to-be-derived output value lies by use of the spatial coordinate data S61 and outputs an output signal S81 representing the divided polyhedron (ST44).

Further, the boundary surface neighborhood determining section G17 determines whether or not the to-be-derived output value lies near the boundary surface of the selected divided tetrahedron by use of the result S52 of magnitude comparison by the comparison operating section G5 and outputs a determination result S71 (ST45). If it is determined that the to-be-derived output value lies near the boundary surface, the interpolation operating process by interpolation is effected for all of the divided tetrahedrons which are in contact with the boundary surface by use of the interpolation operation processing sections 13Y, 23Y, 13M, 23M, 13C, 23C (ST46).

Then, the correcting process is effected by weighting data based on the determination result S71 by use of the output values 31Y, 32Y, 31M, 32M, 31C, 32C subjected to the interpolation for the respective divided tetrahedrons in the data correction processing sections 14Y, 14M, 14C and thus a to-be-derived output value can be obtained (ST47). The construction of the image processing device shown in FIG. 15 becomes slightly larger in the circuit scale in comparison with the construction shown in FIG. 3, but the precision of data correction can be enhanced.

Figure 16:
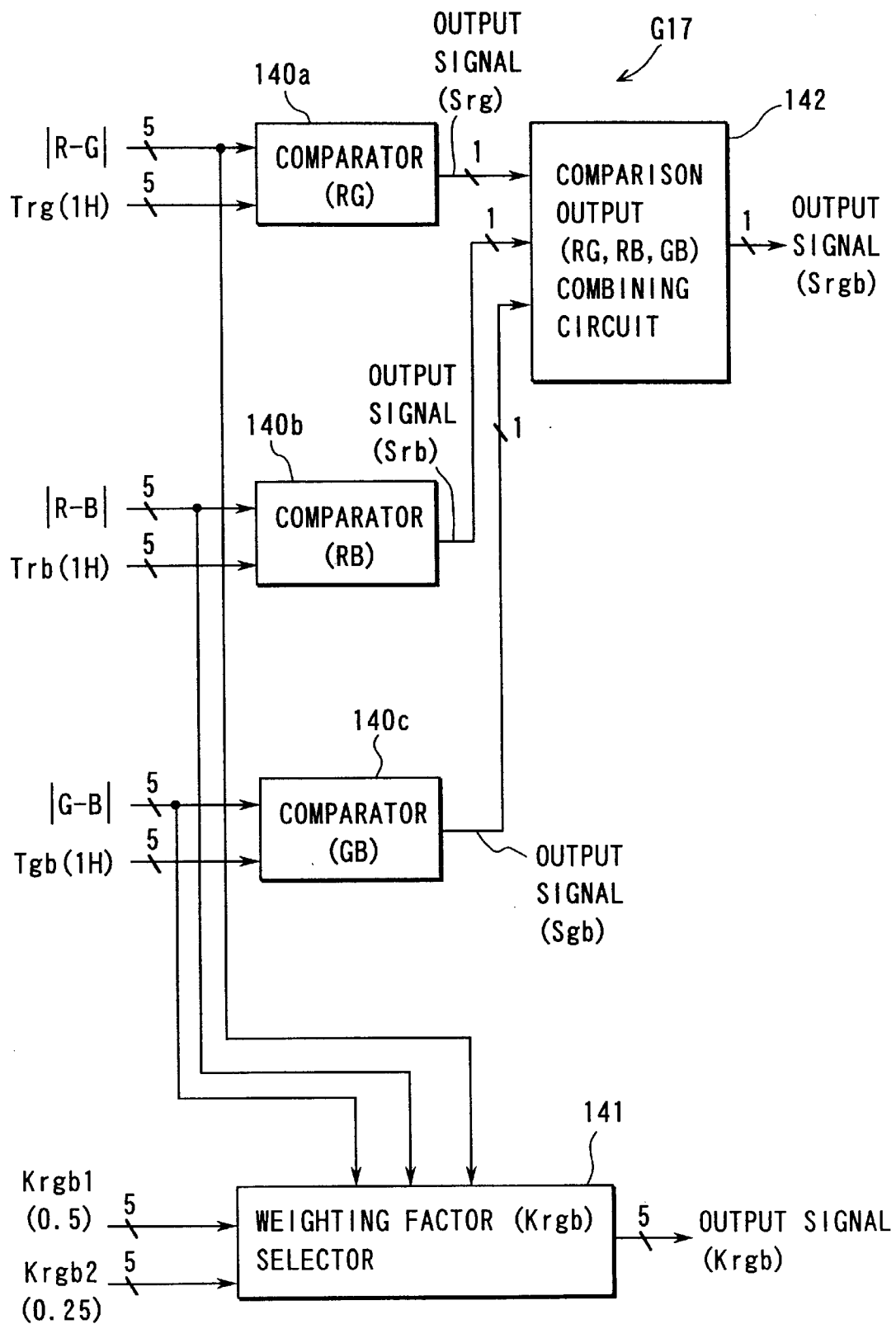
FIG. 16 is a diagram showing the schematic construction of a boundary surface neighborhood determining section.

FIG. 16 shows the schematic construction of the boundary surface neighborhood determining section G17. The boundary surface neighborhood determining section G17 includes comparators 140a to 140c, weighting factor selecting section 141 and comparison output combining circuit 142.

Figure 17:
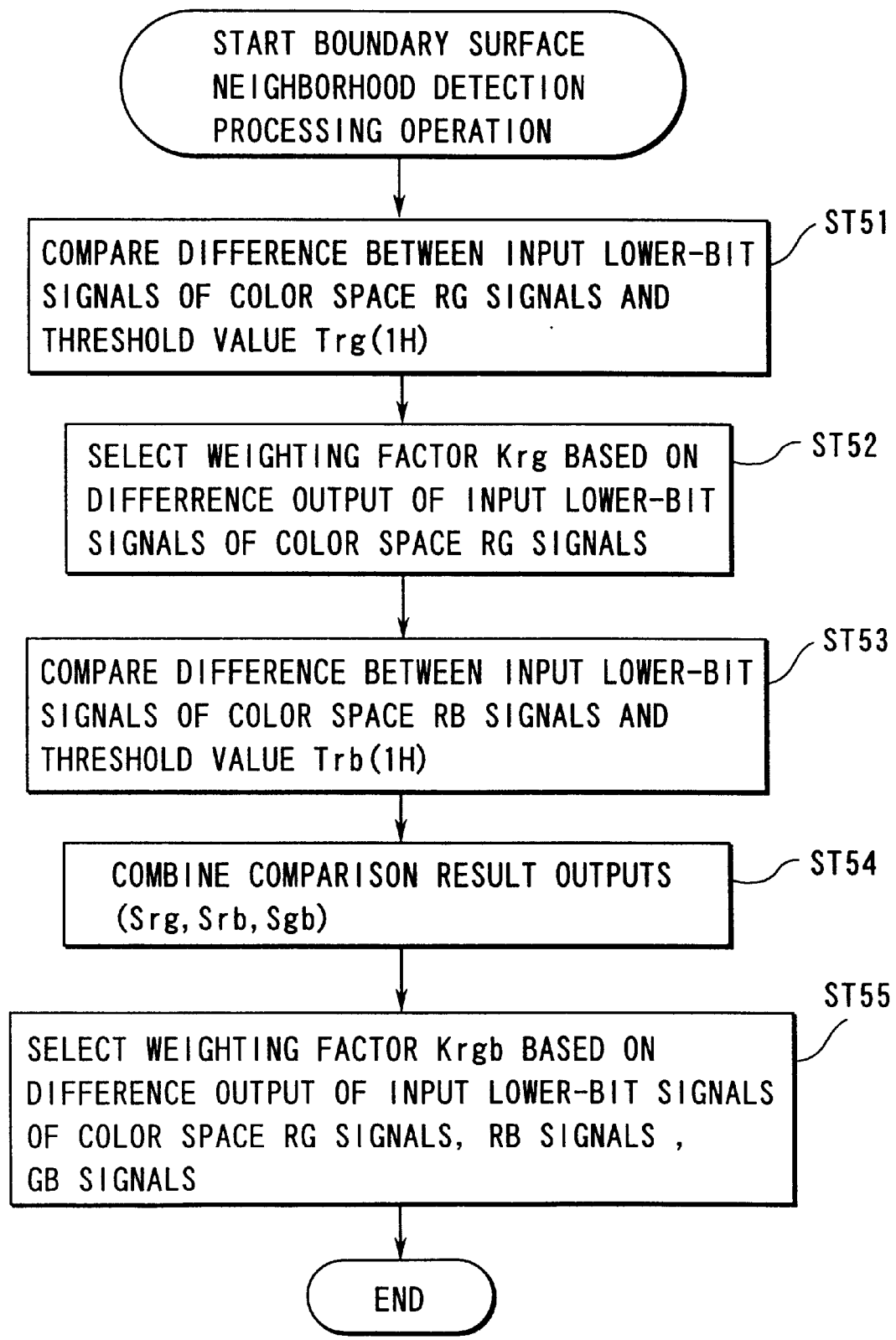
FIG. 17 is a flowchart for illustrating the operation of a boundary surface neighborhood detecting process.

The operation of the boundary surface neighborhood detecting process is explained with reference to the flowchart of FIG. 17. The comparator 140a compares a difference ($|R-G|$) between the input lower 5-bit signals of the color space RG signals and a threshold value Trg (1 H), determines that a to-be-derived output value lies near the boundary surface if the difference value is not larger than the threshold value, and outputs a 1-bit output signal (Srg) as the result of determination (ST51).

The comparator 140b compares a difference ($|R-B|$) between the input lower 5-bit signals of the color space RB signals and a threshold value Trb (1 H), determines that a to-be-derived output value lies near the boundary surface if the difference value is not larger than the threshold value, and outputs a 1-bit output signal (Srb) as the result of determination (ST52).

The comparator 140c compares a difference ($|G-B|$) between the input lower 5-bit signals of the color space GB signals and a threshold value Tgb (1 H), determines that a to-be-derived output value lies near the boundary surface if the difference value is not larger than the threshold value, and outputs a 1-bit output signal (Sgb) as the result of determination (ST53).

The comparison output combining circuit 142 combines the output signals Srg, Srb, Sgb output as the results of comparison to output a 1-bit output signal Srgb (ST54).

Further, the weighting factor selecting section 141 selects a weighting factor Krgb based on the minimum value of the difference outputs of the color space RG signals, RB signals, GB signals (ST55). If the minimum value of the difference outputs is 0 H, the weighting factor Krgb=0.5, and if the minimum value is 1 H, Krgb=0.25. As described in the first embodiment, it is desirable to set values of approx. 1 or 2 as the threshold values Trg, Trb, Tgb and set a value of 2 to the n-th power as the weighting factor Srgb.

Next, the data correction process is explained.

Figure 18:
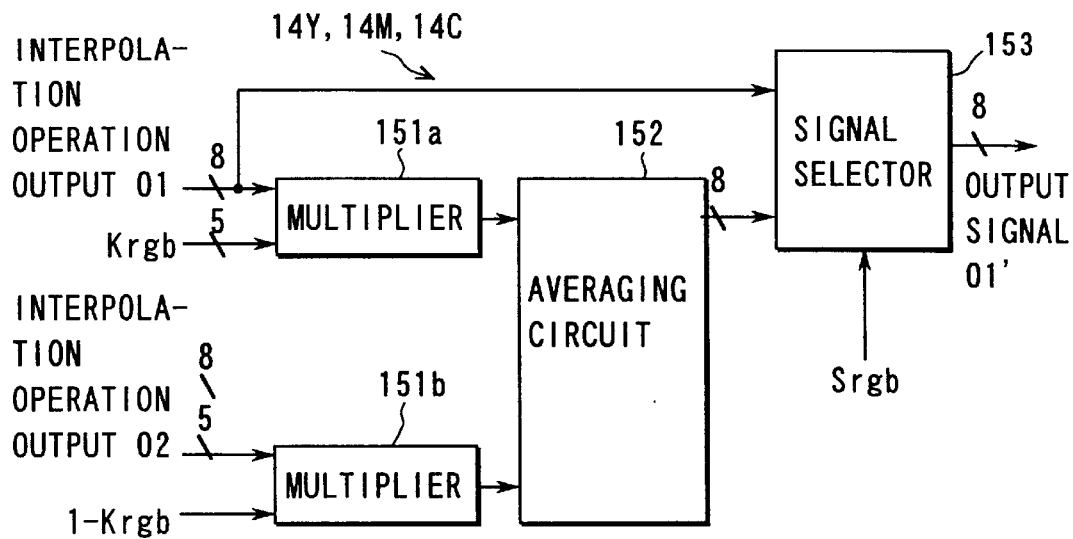
FIG. 18 is a diagram showing the construction of a data correction processing section.

FIG. 18 shows the construction of each of the data correction processing sections 14Y, 14M, 14C. Each of the data correction processing sections 14Y, 14M, 14C includes multipliers 151a, 151b, averaging circuit 152 and signal selecting section 153. The following equation is calculated based on input interpolation operation outputs 01, 02, Krgb, (1 −Krgb) by the multipliers 151a, 151b and the averaging circuit 152.

$$01'=(Krgb*01+(1-Krgb)*02)/2$$

Figure 19:
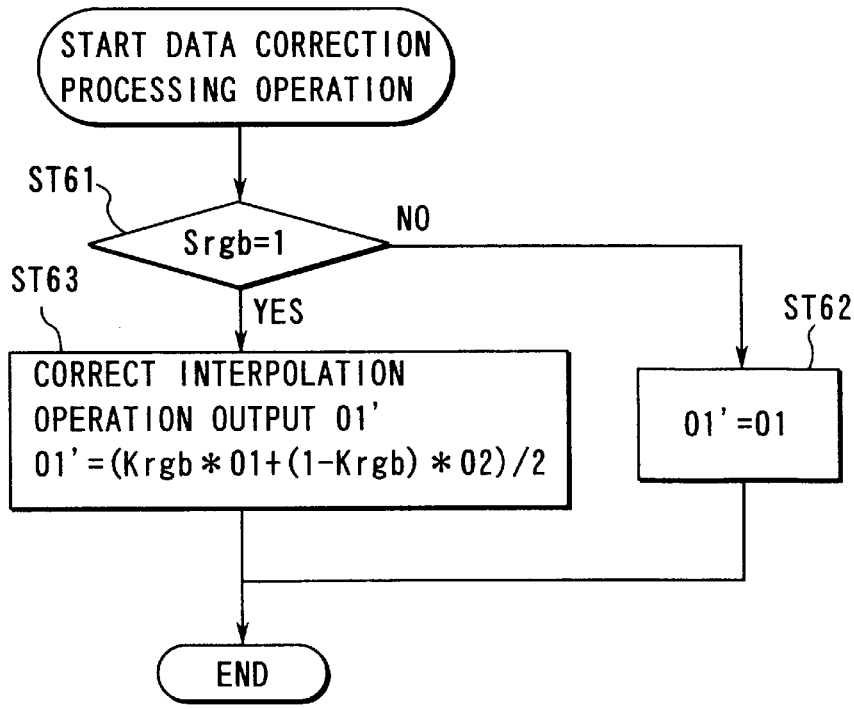
FIG. 19 is a flowchart for illustrating the operation of a data correction process.

The data correction processing operation is explained with reference to the flowchart of FIG. 19. In the divided tetrahedron q2 (P5-P0-P3-P2) shown in FIG. 21A, the lower 5-bit signals of the input 3-dimensional color space RGB signals are set such that r>b, g>b, r>b, and (r−b)=1 H, the boundary surface neighborhood determining section G17 (FIG. 16) determines that a to-be-derived output value lies near the boundary surface, and Srgb=1 and Krgb=0.5 are input to the data correction processing sections 14Y, 14M, 14C.

In the data correction processing section 14Y, 14M, 14C, the 8-bit interpolation operation output 01' is corrected based on the above equation in the multipliers 151a, 151b and averaging circuit 152 (ST63) since Srgb=1 is input to the signal selecting section 153 (ST61). Further, if Srgb input to the signal selecting section 153 is 0 (ST61), the interpolation operation output 01' is not corrected (ST62).

As described above, according to the embodiments of this invention, in the interpolation method of the 3-dimensional color space, the precision of interpolation can be enhanced, the continuity of the result of output can be maintained and the circuit scale can be reduced.

Further, in the 8-point interpolation method, an increase in the number of multiplication operations in the interpolation operation process and enlargement in the circuit scale which are caused because the unit cube is not divided can be prevented.

Further, in the 6-, 5-, 4-point interpolation methods, an increase in the interpolation error near the divided boundary surface and the discontinuity between to-be-derived output values which are caused because the unit cube is divided into hexahedrons, pentahedrons, tetrahedrons can be prevented.

Therefore, an image processing apparatus using the interpolation method for the 3-dimensional color space capable of reducing the circuit scale, enhancing the precision of interpolation and maintaining the continuity of the result of output and an image forming apparatus having the image processing apparatus can be provided.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:

means for storing lattice-point data of a plurality of unit cubes into which color conversion space is divided, and for supplying the lattice-point data of one of the unit cubes which corresponds to input image signals, each of the unit cubes being constituted by a plurality of divided polyhedrons;

means for selecting a divided polyhedron, as a selected divided polyhedron, in which an output value to be derived is present based on the input image signals;

means for determining whether or not the to-be-derived output value lies on or near a boundary surface of the selected divided polyhedron and an adjacent one of said plurality of divided polyhedrons, based on the input image signals;

means for correcting the lattice-point data supplied from said storing means when said determining means determines that the to-be-derived output value lies on or near the boundary surface; and interpolation operating means for effecting the interpolation operation for said selected divided polyhedron by use of the lattice-point data corrected by said correction means.

2. An apparatus according to claim 1, which further comprises operation data selecting means for selecting interpolation operation data for the divided polyhedrons selected by said divided polyhedron selecting means from the lattice-point data supplied from said correcting means and in which said interpolation operation means includes means for effecting the interpolation operation by use of the interpolation operation data selected by said operation data selecting means.

3. An apparatus according to claim 2, wherein said operation data selecting means includes means for selecting interpolation operation data corresponding to the divided polyhedron selected by said divided polyhedron selecting means from the lattice-point data which is corrected by said correction means.

4. An apparatus according to claim 1, wherein said storage means includes means for supplying the lattice-point data based on a preset number of upper bits of the input image signals;

said apparatus further comprising comparing means for comparing the magnitudes of lower bits of the input image signals other than the preset number of upper bits; and position determining means for determining a spatial position of the to-be-derived output value based on the result of comparison of said comparing means;

wherein said divided polyhedron selecting means includes means for selecting the divided polyhedron based on the spatial position of the output value determined by said position determining means.

5. An apparatus according to claim 1, wherein said storage means includes means for supplying the color space conversion data based on a preset number of upper bits of the input image signal;

said apparatus further comprising comparing means for comparing the magnitudes of lower bits of the input image signals other than the preset number of upper bits;

wherein said determining means includes means for determining whether or not the output value lies near the boundary surface based on the result of comparison by said comparing means.

6. An apparatus according to claim 1, wherein said correction means includes means for correcting the lattice-point data according to the divided polyhedron selected by said divided polyhedron selecting means and an result of said determining means.

7. An apparatus according to claim 1, wherein the input image signals are 3-dimensional color space RGB signals and the lattice-point data is lattice-point data of a unit cube in the 3-dimensional color space for color conversion.

8. An apparatus according to claim 7, wherein the interpolation operation data is lattice-point, data of the divided polyhedron selected by said divided polyhedron selecting means.

9. An apparatus according to claim 7, wherein said determining means includes means for determining whether or not the to-be-derived output value is present on or near the boundary surface of the divided polyhedron according to a difference between the respective signals of the 3-dimensional color space RGB signals.

10. An apparatus according to claim 7, wherein said determining means includes means for determining whether or not the to-be-derived output value is present on or near the boundary surface of the divided polyhedron according to a difference between the respective signals of the 3-dimensional color space RGB signal, and means for supplying a weighting factor according to a difference between the respective signals of the 3-dimensional color space RGB signals, and said correction means includes means for correcting the lattice-point data by use of the weighting factor.

11. An image processing apparatus comprising:

means for reading a document image and supplying an image signal corresponding to the document image;

means for storing lattice-point data of a plurality of unit cubes into which color conversion space is divided, and for supplying the lattice-point data of one of the unit cubes which corresponds to input image signals, each of the unit cubes being constituted by a plurality of divided polyhedrons;

means for selecting a divided polyhedron, as a divided polyhedron, in which an output value to be derived is present based on the input image signals;

means for determining whether or not the to-be-derived output value lies on or near a boundary surface of the selected divided polyhedron and an adjacent one of the plurality of divided polyhedrons, based on the input image signals;

means for correcting the lattice-point data supplied from said storing means when said determining means determines that the to-be-derived output value lies on or near the boundary surface;

interpolation operating means for effecting the interpolation operation for the selected divided polyhedron by use of the lattice-point data corrected by said correction means and supplying the to-be-derived output value; and means for forming an image based on the output value supplied from said interpolation operating means.

12. An apparatus according to claim 11, which further comprises operation data selecting means for selecting interpolation operation data for the divided polyhedron selected by said divided polyhedron selecting means from the lattice-point data supplied from said correcting means and in which said interpolation operating means includes means for effecting the interpolation operation by use of the interpolation operation data selected by said operation data selecting means.

13. An apparatus according to claim 11, wherein said storage means includes means for supplying the lattice-point data based on a preset number of upper bits of the input image signals;

said apparatus further comprising comparing means for comparing the magnitudes of lower bits of the input image signals other than the preset number of upper bits;

wherein said determining means includes means for determining whether or not the output value lies near the boundary surface based on the result of comparison by said comparing means.

14. An apparatus according to claim 11, wherein the input image signals are 3-dimensional color space RGB signals, the lattice-point data is lattice-point data of a unit cube in the 3-dimensional color space for color conversion, and the interpolation operation data is lattice-point data of the divided polyhedron selected by said divided polyhedron selecting means.

15. An apparatus according to claim 14, wherein said determining means includes means for determining whether or not the to-be-derived output value is present on or near the boundary surface of the divided polyhedron according to a difference between the respective signals of the 3-dimensional color space RGB signals.

16. An apparatus according to claim 14, wherein said determining means includes means for determining whether or not the to-be-derived output value is present on or near the boundary surface of the divided polyhedron according to a difference between the respective signals of the 3-dimensional color space RGB signals, and means for supplying a weighting factor according to a difference between the respective signals of the 3-dimensional color space RGB signals, and said correction means includes means for correcting the lattice-point data by use of the weighting factor.

17. An image processing method, comprising:

supplying lattice-point data of one of a plurality of unit cubes into which color conversion space is divided, by referring to a lookup table comprising lattice-point data of the unit cubes, the lattice-point data of said one of the unit cubes corresponding to input image signals, each of the unit cubes being constituted by a plurality of divided polyhedrons;

selecting one of the divided polyhedrons of said one of the unit cubes, as a selected divided polyhedron, in which an output value to be derived lies, based on the input image signals;

determining whether or not the output value lies on or near a boundary surface of said selected divided polyhedron and an adjacent one of the divided polyhedrons, based on the input image signals;

correcting the lattice-point data supplied in said lattice-point data supplying step, when it is determined in said determining step that the output value lies on or near the boundary surface; and performing an interpolation operation for said selected divided polyhedron by use of the lattice-point data corrected in said correcting step.

* * * * *